United States Patent
Baba et al.

(10) Patent No.: US 8,773,719 B2
(45) Date of Patent: Jul. 8, 2014

(54) POWER SUPPLY CONTROL DEVICE AND METHOD THEREOF, IMAGE PROCESSING APPARATUS, AND NON-TRANSITORY COMPUTER READABLE MEDIUM STORING POWER SUPPLY CONTROL PROGRAM

(75) Inventors: Motofumi Baba, Kanagawa (JP);
Kazuhiko Narushima, Kanagawa (JP);
Masafumi Ono, Kanagawa (JP); Kenta Ogata, Kanagawa (JP); Kouichi Azuma, Kanagawa (JP); Kenji Kuroishi, Kanagawa (JP); Hidenori Horie, Kanagawa (JP); Keiko Shiraishi, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 362 days.

(21) Appl. No.: 13/345,492

(22) Filed: Jan. 6, 2012

(65) Prior Publication Data

US 2013/0010335 A1    Jan. 10, 2013

(30) Foreign Application Priority Data

Jul. 7, 2011    (JP) ................. 2011-151061

(51) Int. Cl.
*H04N 1/40* (2006.01)
*G06F 3/12* (2006.01)

(52) U.S. Cl.
USPC ........ 358/3.01; 358/1.15; 358/1.13; 358/504; 713/300; 713/320; 713/323; 700/297; 399/88

(58) Field of Classification Search
None
See application file for complete search history.

(56) References Cited

U.S. PATENT DOCUMENTS

| 7,516,335 | B2 * | 4/2009 | Watanabe | 713/300 |
|---|---|---|---|---|
| 2008/0052740 | A1 | 2/2008 | Sakai et al. | |
| 2010/0231807 | A1 | 9/2010 | Sakai et al. | |
| 2011/0255010 | A1 | 10/2011 | Sakai et al. | |
| 2014/0029037 | A1 * | 1/2014 | Oyoshi | 358/1.13 |

FOREIGN PATENT DOCUMENTS

| JP | 5-45471 A | 2/1993 |
|---|---|---|
| JP | 2004-175099 A | 6/2004 |
| JP | 2007-279603 A | 10/2007 |
| JP | 2008-54085 A | 3/2008 |

* cited by examiner

*Primary Examiner* — Quang N Vo
(74) *Attorney, Agent, or Firm* — Sughrue Mion, PLLC

(57) ABSTRACT

There is disclosed a power supply control device including a load that executes a predetermined process and operates when power is supplied; a power supply state transition controlling unit that allows at least the load to be transitioned to a power supply state, or a power interruption state; plural detection units that can operate within respective power-consumption ranges, and detects information related to the execution of the load; a power supply control unit for detection unit, which supplies power continuously to a minimum power-consumption type detection unit, and which supplies power to a detection unit having a relatively large power-consumption based on a detection result of a detection unit having a relatively small power-consumption; and a transition time determining unit that is executed when power is supplied with respect to a maximum power-consumption type detection unit, and that determines a transition time by the power supply state transition controlling unit.

20 Claims, 19 Drawing Sheets

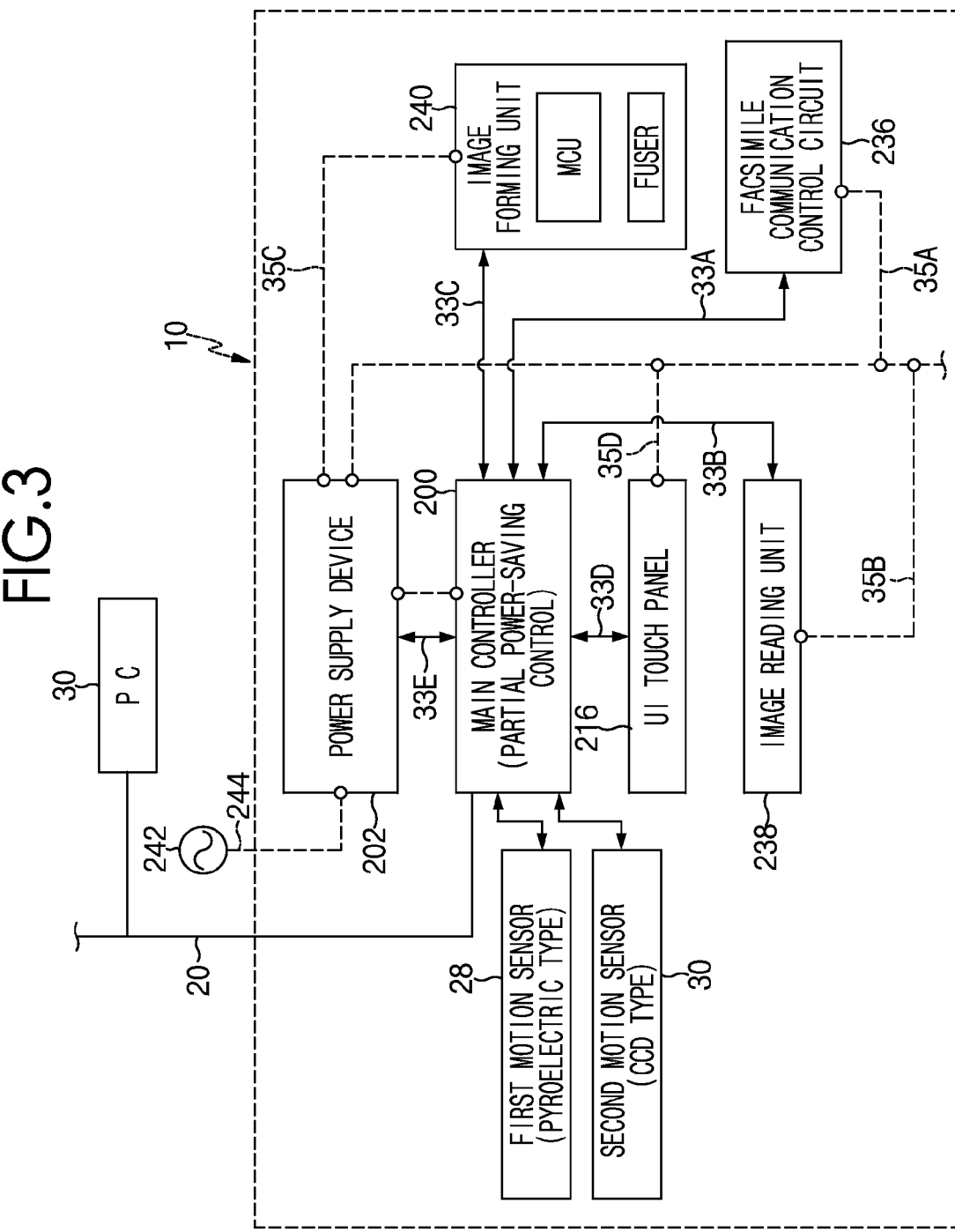

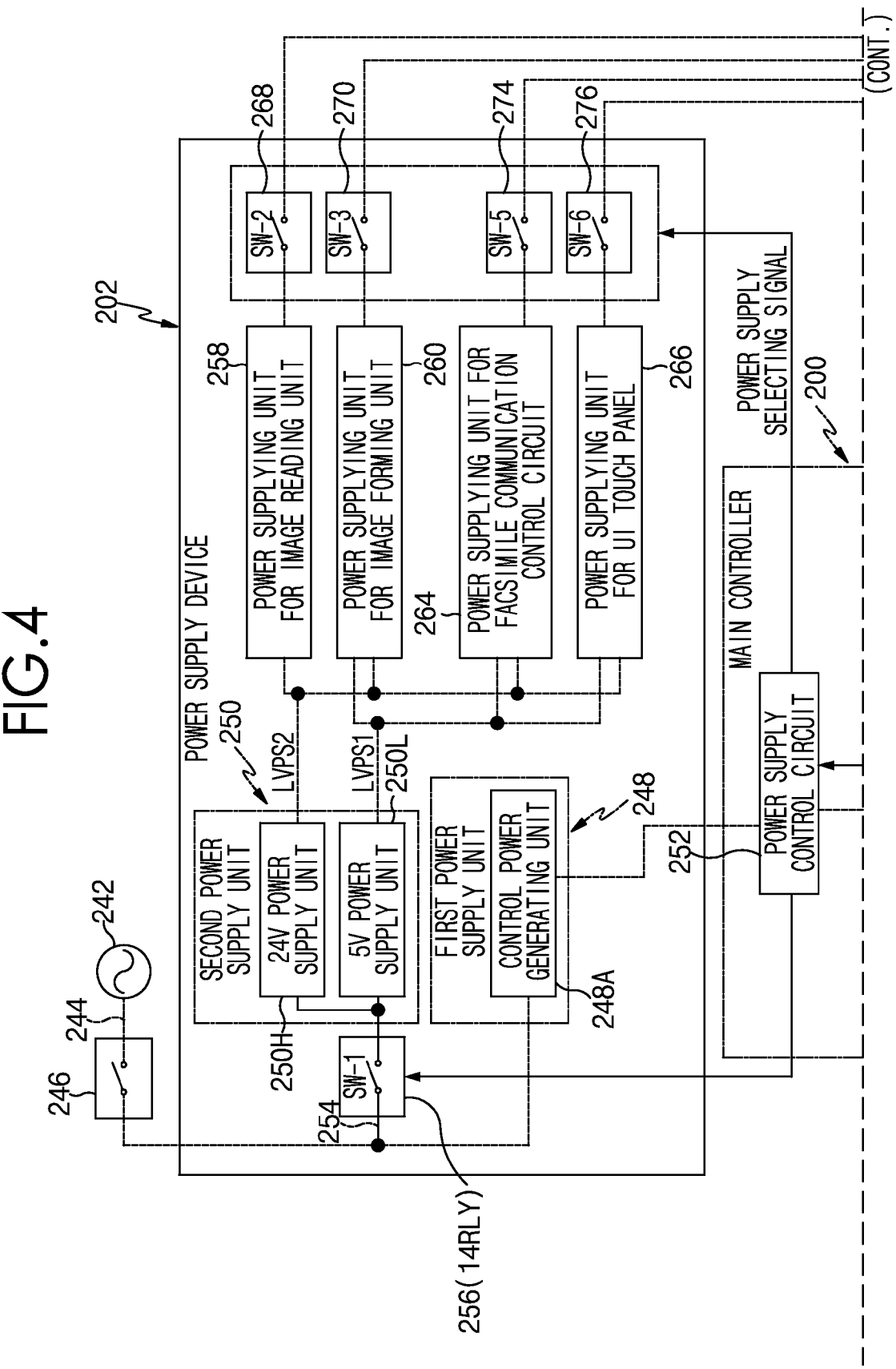

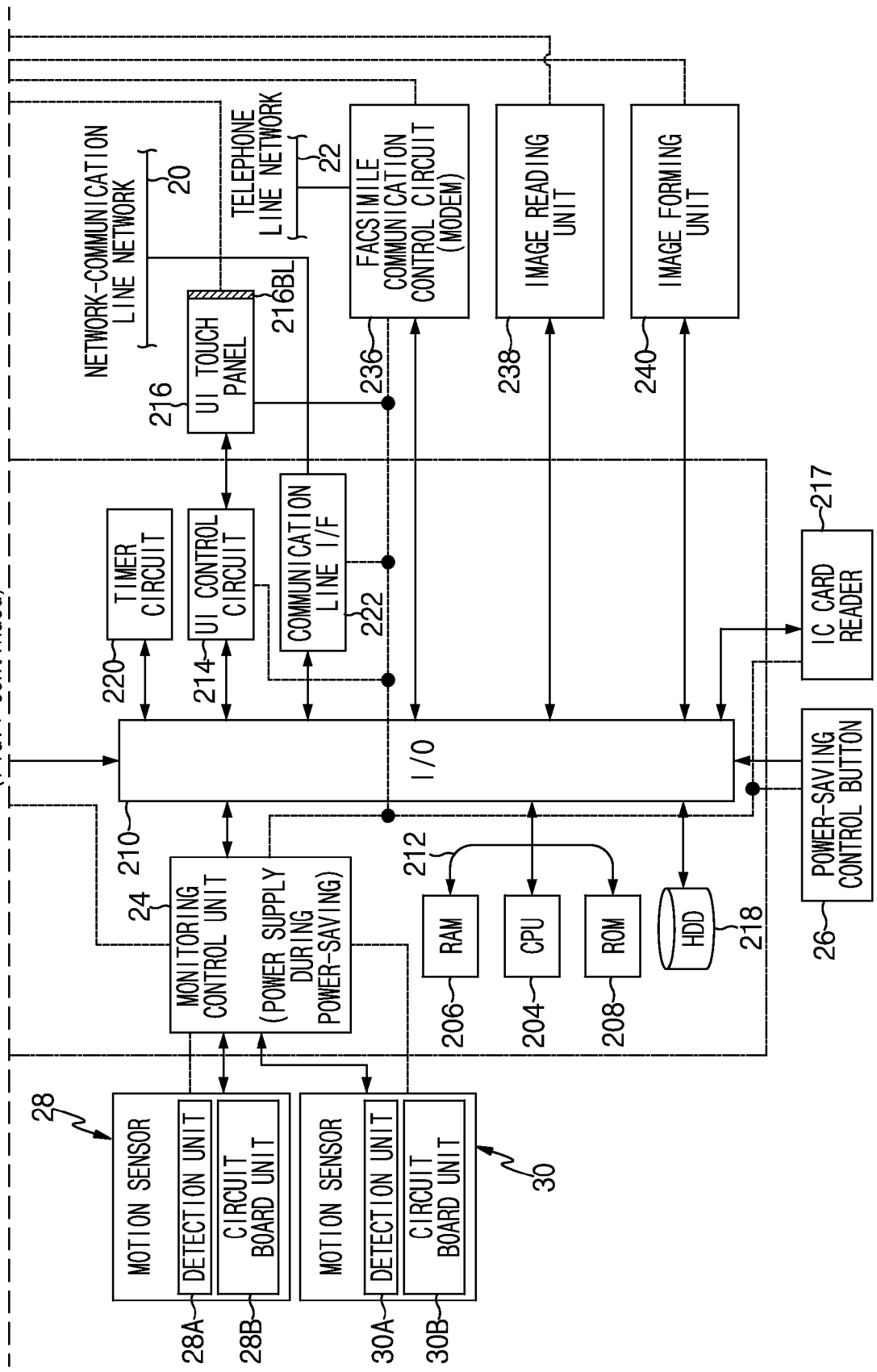

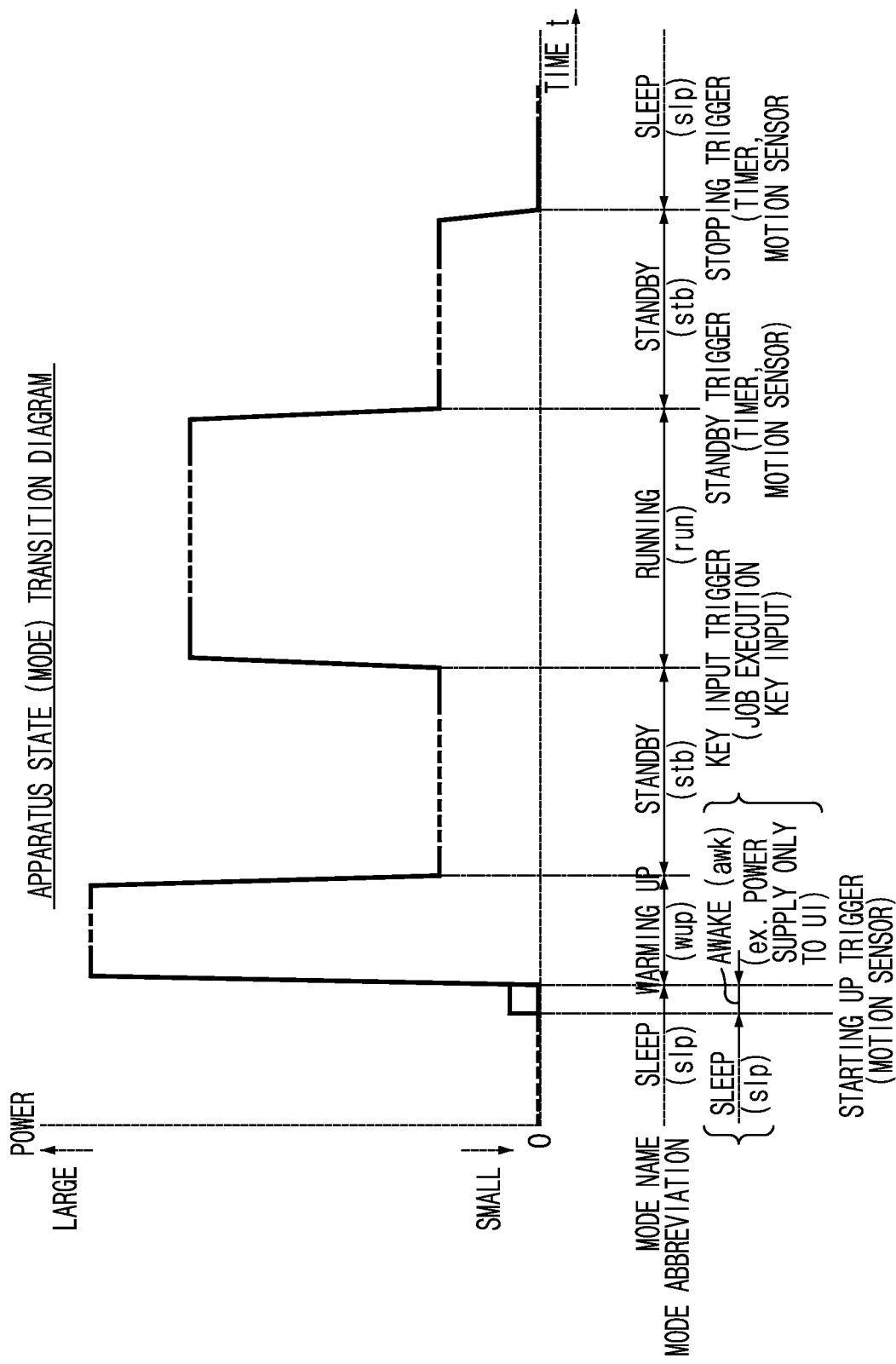

FIG.6

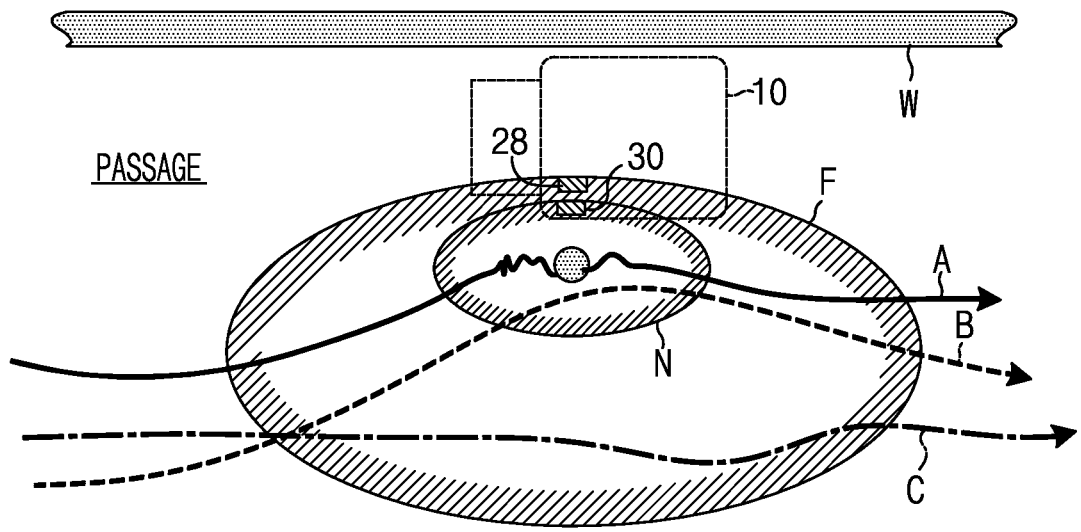

A ⟶ MOVING TRAJECTORY IN WHICH PERSON APPROACHES POSITION AT WHICH IMAGE PROCESSING APPARATUS MAY BE OPERATED, STOPS TO OPERATE IMAGE PROCESSING APPARATUS FOR INTENDED PURPOSE, AND THEN GOES AWAY

MOVING AREA (OUTSIDE OF AREA → AREA F → AREA N → AREA F → OUTSIDE OF AREA)

B ----⟶ MOVING TRAJECTORY IN WHICH PERSON APPROACHES POSITION AT WHICH IMAGE PROCESSING APPARATUS MAY BE OPERATED, AND THEN PASSES BY IMAGE PROCESSING APPARATUS

MOVING AREA (OUTSIDE OF AREA → AREA F → AREA N → AREA F → OUTSIDE OF AREA)

C —·—⟶ MOVING TRAJECTORY IN WHICH PERSON DOES NOT APPROACH POSITION AT WHICH IMAGE PROCESSING APPARATUS MAY BE OPERATED, AND PASSES BY IMAGE PROCESSING APPARATUS

MOVING AREA (OUTSIDE OF AREA → AREA F → OUTSIDE OF AREA)

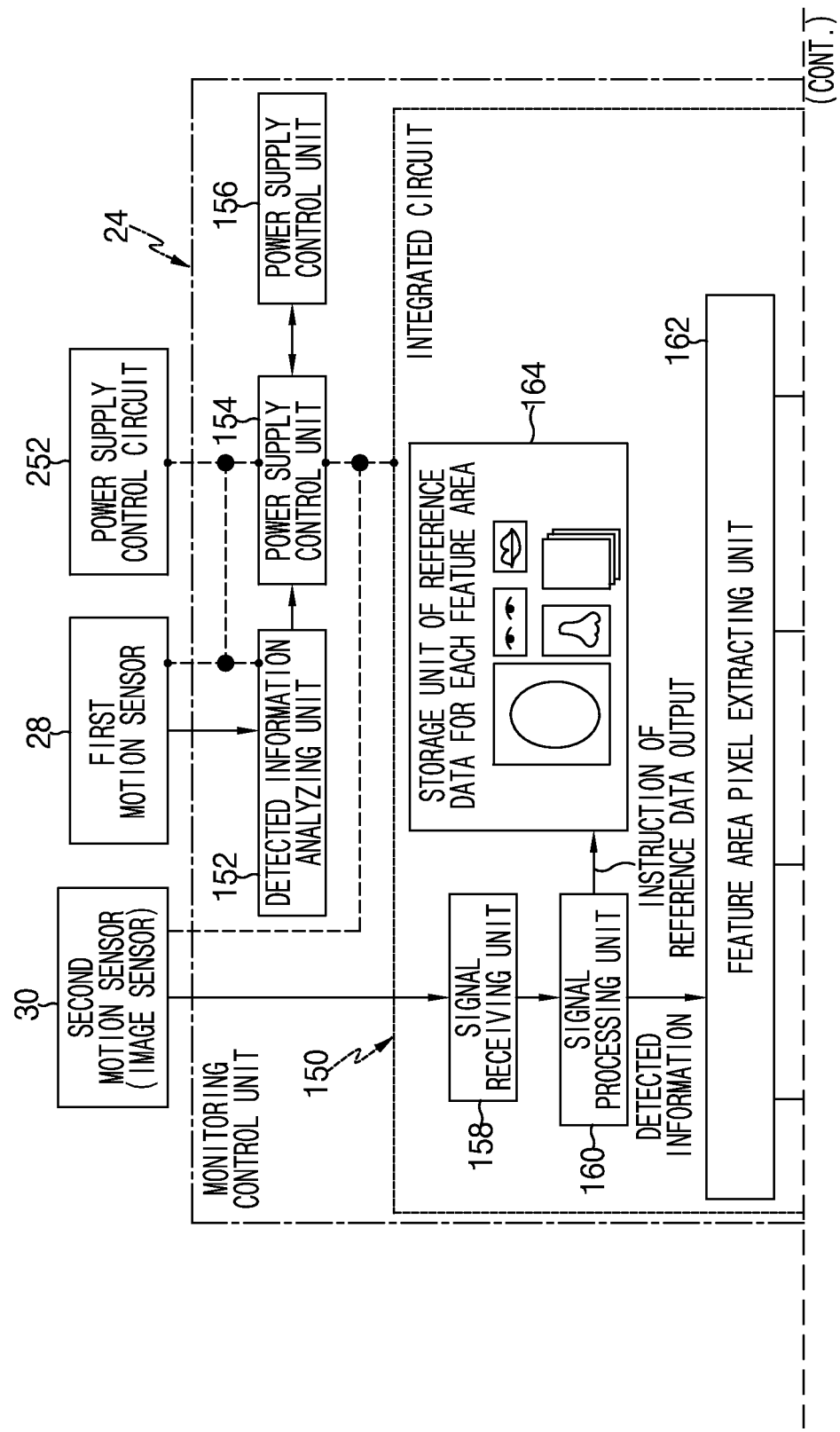

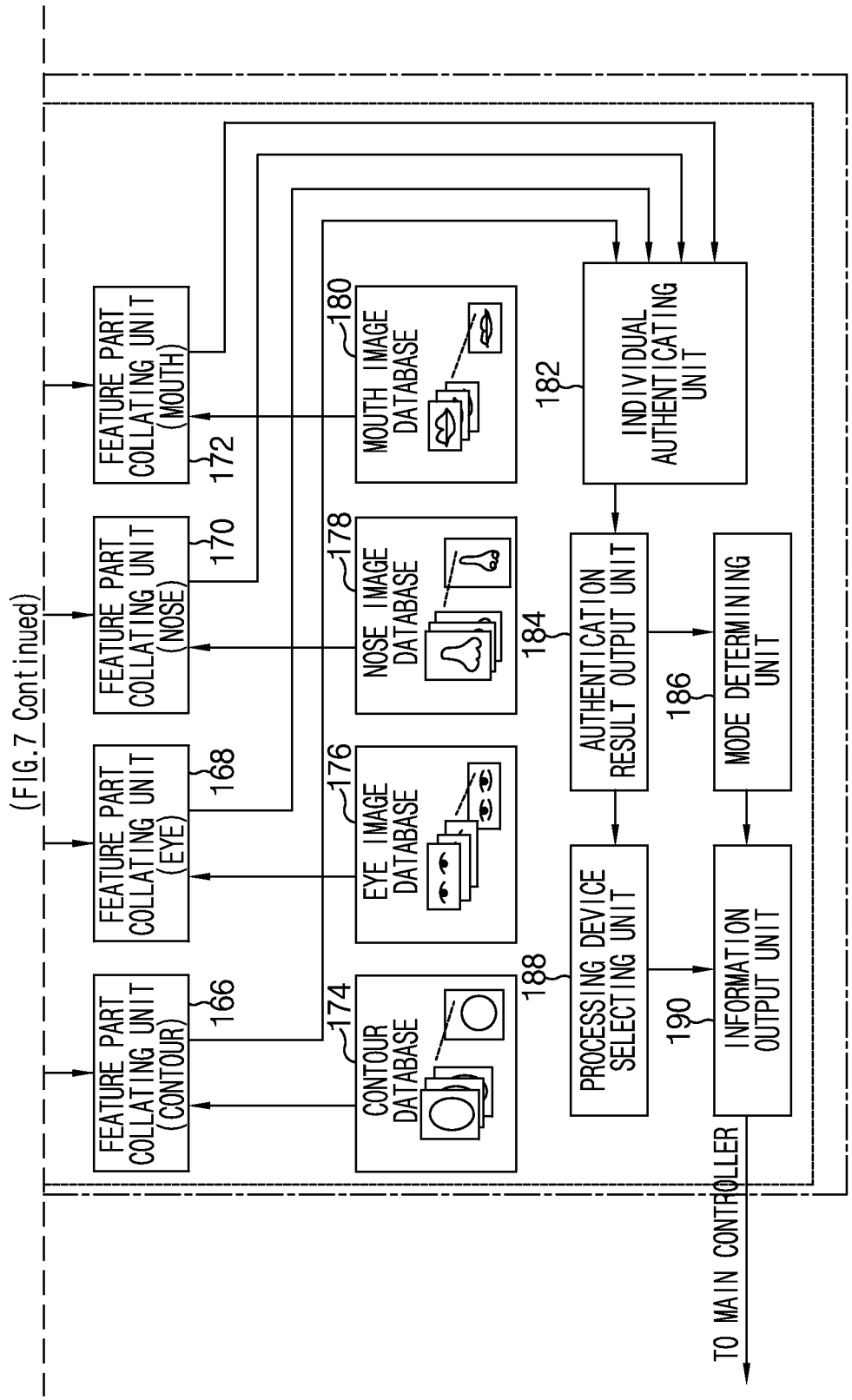

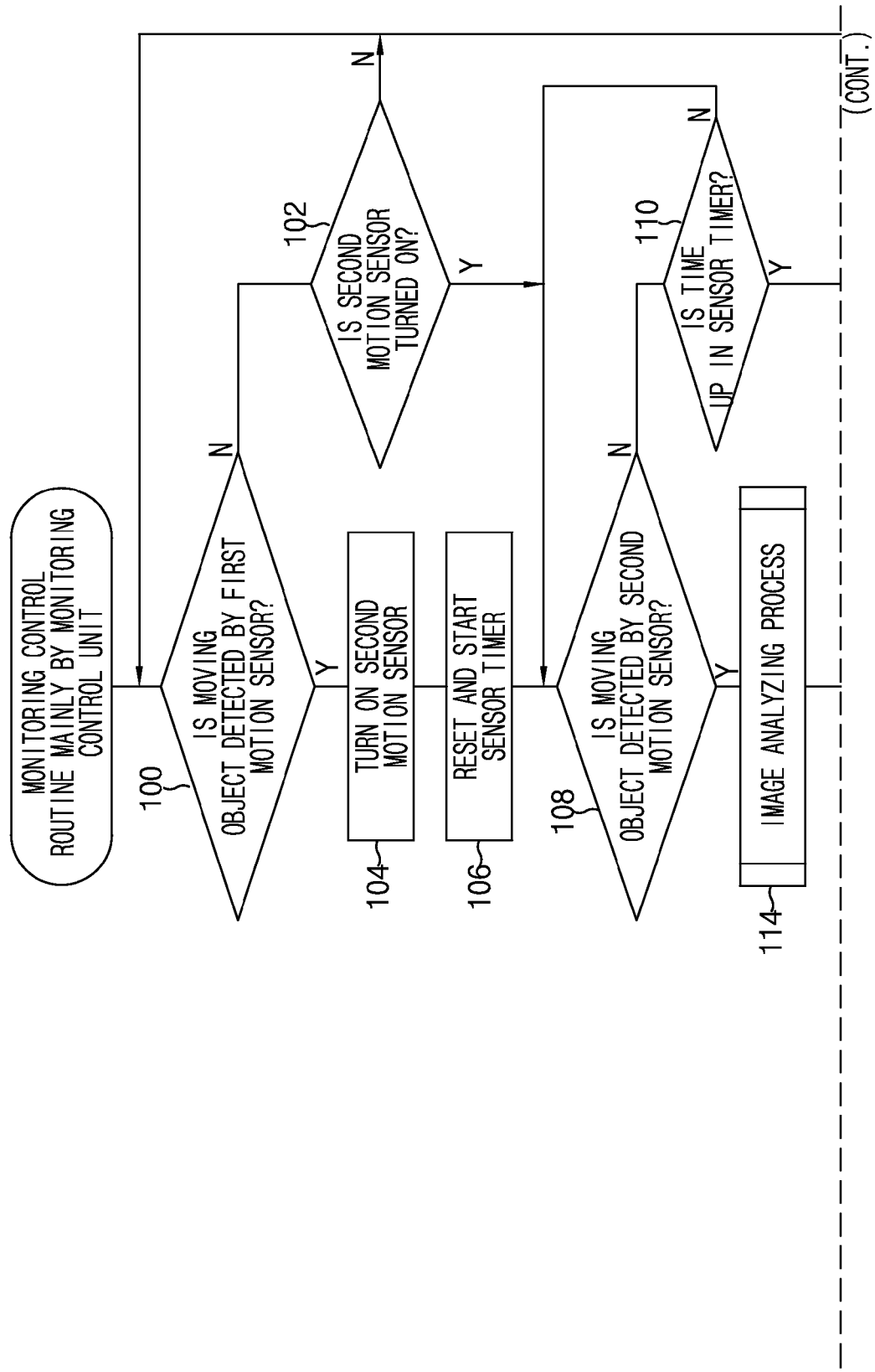

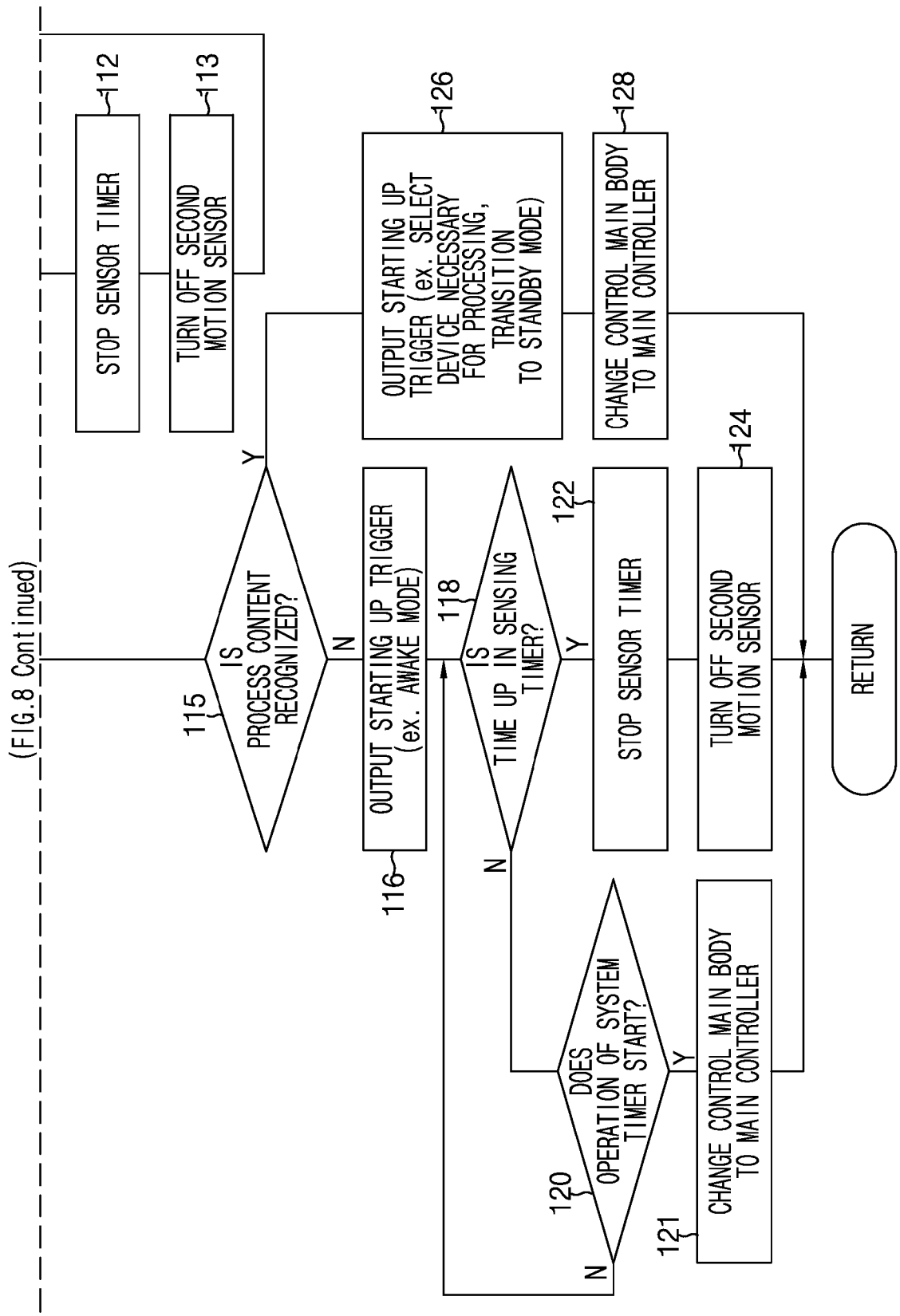

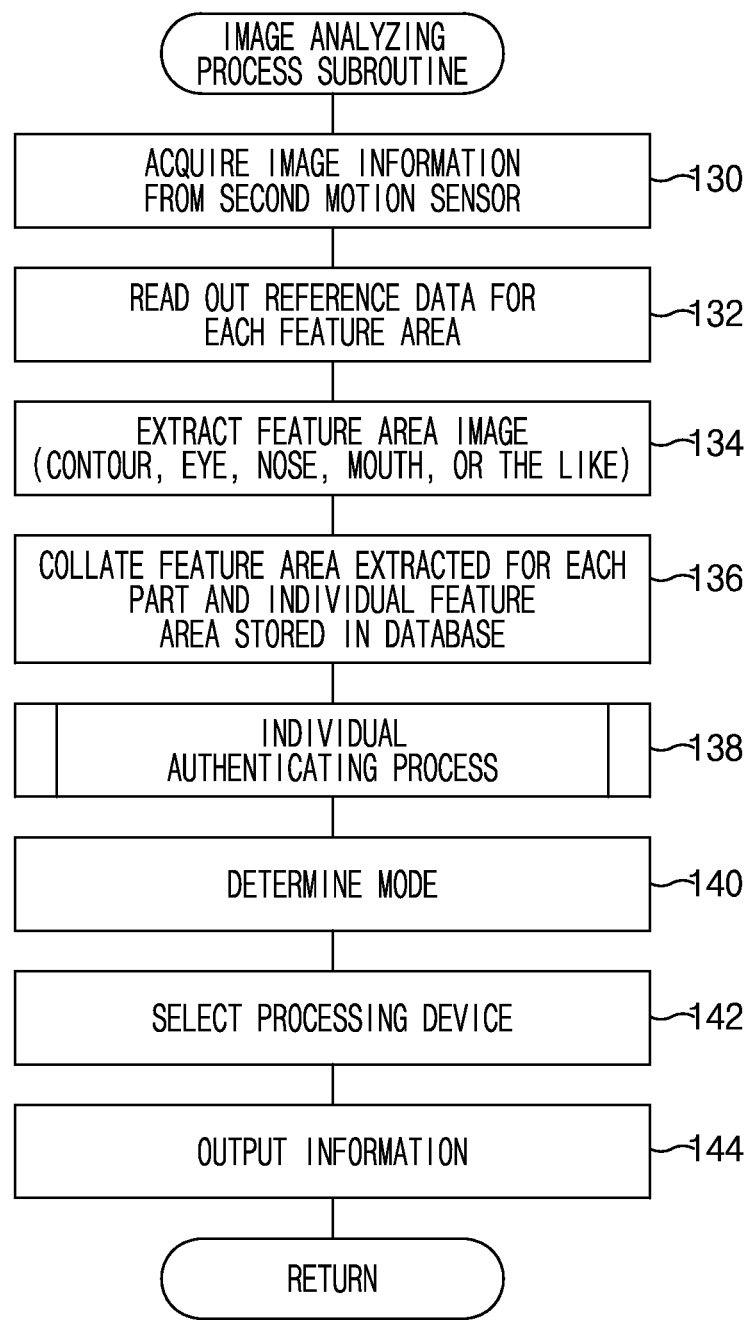

*1 HERE, TEMPERATURE AREA IS DIVIDED INTO FOUR STEPS,
BUT THE NUMBER OF STEPS IS VARIABLE DEPENDING
ON TEMPERATURE RESOLUTION

POWER SUPPLY CONTROL DEVICE AND METHOD THEREOF, IMAGE PROCESSING APPARATUS, AND NON-TRANSITORY COMPUTER READABLE MEDIUM STORING POWER SUPPLY CONTROL PROGRAM

CROSS-REFERENCE TO RELATED APPLICATIONS

This application is based on and claims priority under 35 USC 119 from Japanese Patent Application No. 2011-151061 filed Jul. 7, 2011.

BACKGROUND (i) Technical Field

The present invention relates to a power supply control device, an image processing device and a method thereof, an image processing apparatus, and a non-transitory computer readable medium storing a power supply control program.

(ii) Related Art

A motion sensor control is disclosed as one technology that automates a power supply control with respect to an apparatus that is an object to which power is supplied.

SUMMARY

According to an aspect of the invention, there is provided a power supply control device including a load that executes a predetermined process and operates when power is supplied from a power supply unit; a power supply state transition controlling unit that allows at least the load to be transitioned to a power supply state in which power is supplied from the power supply unit, or a power interruption state in which power is not supplied from the power supply unit; plural detection units that can operate within respective power-consumption ranges that are set in a stepwise manner, and detects information related to the execution of the load; a power supply control unit for detection unit, which supplies power continuously with respect to a minimum power-consumption type detection unit that operates with the smallest power-consumption among the plural detection units, and which supplies power to a detection unit having a relatively large power-consumption based on a detection result of a detection unit having a relatively small power-consumption among the plural detection units; and a transition time determining unit that is executed when power is supplied with respect to a maximum power-consumption type detection unit operating with the largest power-consumption, among the plural detection units, through a stepwise power supply control performed by the power supply control unit for detection unit, and that determines a transition time by the power supply state transition controlling unit based on the detection result from the maximum power-consumption type detection unit.

BRIEF DESCRIPTION OF THE DRAWINGS

Exemplary embodiments of the present invention will be described in detail based on the following figures, wherein:

FIG. 3 is a block diagram illustrating a configuration of a control system of the image processing apparatus according to the exemplary embodiment of the invention;

FIG. 4 is a schematic diagram illustrating a control system for each function of a main controller and a power supply device according to the exemplary embodiment of the invention;

FIG. 5 is a timing chart illustrating respective mode states, and an event serving as a trigger for transition of the mode states in the image processing apparatus;

FIG. 6 is a plan view illustrating the image processing apparatus and the periphery thereof according to the exemplary embodiment of the invention;

FIG. 7 is a block diagram functionally illustrating a transition destination mode, and a control for selecting a device to which power is supplied, which is performed by an integrated circuit making up a part of a monitoring control unit according to the exemplary embodiment of the invention;

FIG. 8 is a flowchart illustrating a monitoring control routine mainly by the monitoring control unit according to the exemplary embodiment of the invention;

FIG. 9 is a control flowchart illustrating analysis processing subroutine in step 114 of FIG. 8;

FIGS. 13A to 13C are diagrams illustrating an automatic vending machine to which the first and second motion sensors are applied, in which FIG. 13A is a perspective view, and FIGS. 13B and 13C are side elevation view.

DETAILED DESCRIPTION

Configuration of Image Processing Apparatus

Figure 1:
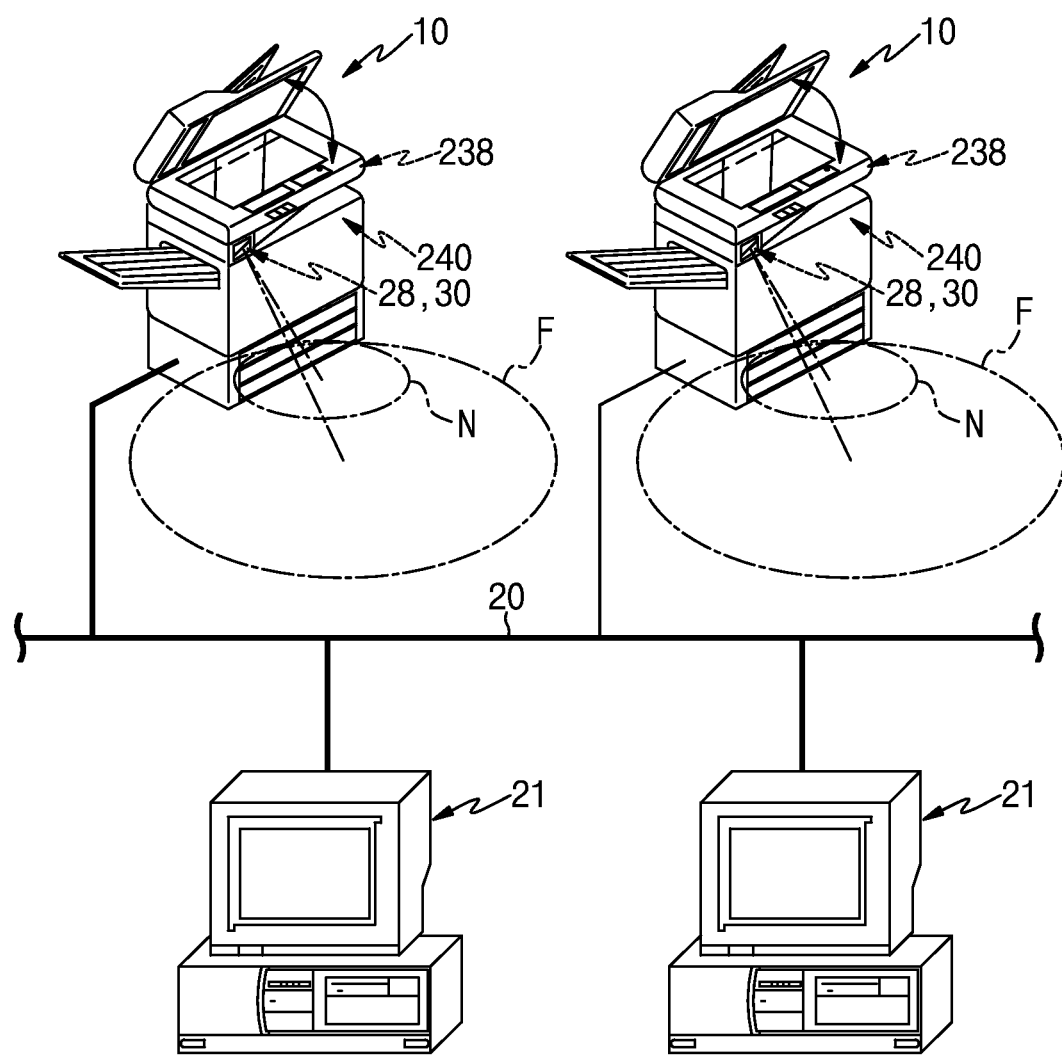
FIG. 1 is a communication line network connection diagram, in which an image processing apparatus according to an exemplary embodiment of the invention is included.

As shown in FIG. 1, an image processing apparatus 10 according to an exemplary embodiment of the invention is connected to a network-communication line network 20 such as the Internet. In FIG. 1, two image processing apparatuses 10 are connected, but this number is not limited, and one apparatus or three or more apparatuses may be connected.

In addition, plural PCs (personal computers) 21 as an information terminal apparatus are connected to the network-communication line network 20. In FIG. 1, two PCs 21 are connected, but this number is not limited, and one PC or three or more PCs may be connected. In addition, as the information terminal apparatus, it is not limited to the PC 21. In addition, the connection is not necessary to be a wired connection. That is, the network-communication line network 20 may be a communication line network that transmits and receives information partially or wholly over a wireless communication.

As shown in FIG. 1, in regard to the image processing apparatus 10, there is a case where the PC 21 remotely transmits, for example, data with respect to the image processing apparatus 10 to make an image forming (printing) instruction, or a case where a user stands in front of the image processing apparatus 10 and makes an instruction for a process such as copying, scanning (image reading), and facsimile transmission and reception through various operations.

Figure 2:
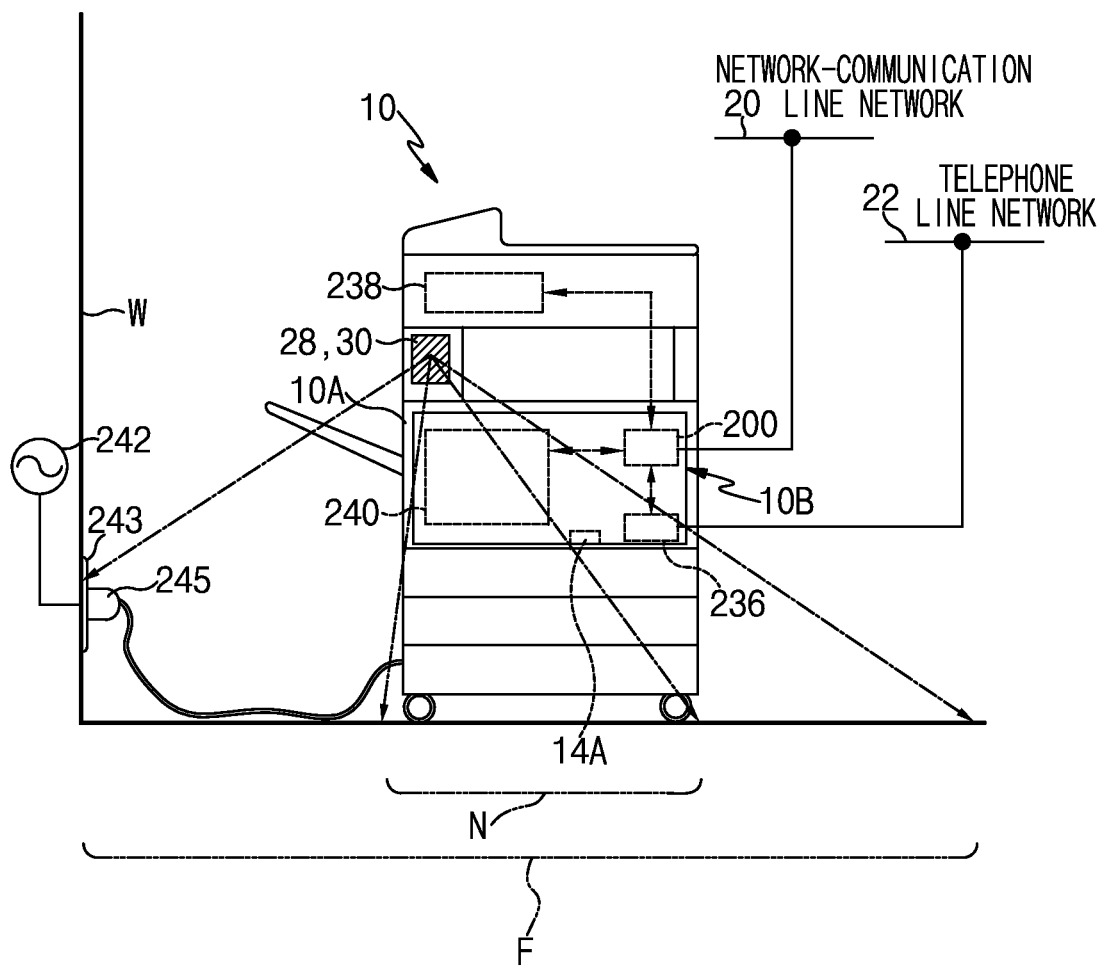
FIG. 2 is a schematic diagram illustrating the image processing apparatus according to the exemplary embodiment of the invention.

FIG. 2 illustrates the image processing apparatus 10 according to an exemplary embodiment of the invention.

The image processing apparatus 10 is covered with a casing 10A and a shuttable door is formed in the casing 10A at an appropriate position. As an example, a front-surface door 10B is shown in FIG. 2, but for example, the door may also be formed at left and right side surfaces. This door 10B is opened when an operator performs a work while touching the inside of the apparatus using hands in the cases of a paper jam, replacement of consumption articles, a periodic check, or the like, and the door 10B is closed in the case of a common process.

An opening and closing detection switch 14A that detects an opening and closing state of the door 10B is provided on a moving trajectory of the door 10B.

The image processing apparatus 10 includes an image forming unit 240 that forms an image on a recording medium, an image reading unit 238 that reads a document image, and a facsimile communication control circuit 236. The image processing apparatus 10 includes a main controller 200, and thereby controls the image forming unit 240, the image reading unit 238, and the facsimile communication control circuit 236, and primarily stores image data of the document image, which is read by the image reading unit 238, or transmits the read image data to the image forming unit 240 or the facsimile communication control circuit 236.

A network-communication line network 20 such as the Internet is connected to the main controller 200, and a telephone line network 22 is connected to the facsimile communication control circuit 236. For example, the main controller 200 is connected to a host computer through the network-communication line network 20 and receives the image data, or the main controller 200 performs a facsimile transmission or a facsimile reception by using the telephone line network 22 through the facsimile communication control circuit 236.

The image reading unit 238 includes a platen that positions the document, a scanning driving mechanism that scans an image of the document placed on the platen and irradiates the document with light, and a photoelectric conversion element such as a CCD that receives light, which is reflected or transmitted by the scanning of the driving mechanism, and converts the received light to an electric signal.

The image forming unit 240 includes a photoreceptor, and a charging device that uniformly charges the photoreceptor, a scanning-exposure unit that scans a light beam based on the image data, an image developing unit that develops an electrostatic latent image formed by being scanning-exposed by the scanning exposure unit, a transfer unit that transfers the developed image on the photoreceptor onto recording paper, and a cleaning unit that cleans the surface of the photoreceptor after the transferring are formed at the periphery of the photoreceptor. In addition, a fixing unit, which fixes the image on the recording paper after the transferring, is provided on a transporting path of the recording paper.

The image processing apparatus 10 includes a plug 245 attached to the front end of an input power line 244, and the plug 245 is inserted into a wiring plate 243 of a commercial power supply 242 wired to a wall surface W so as to supply power to the image processing apparatus 10 from the commercial power supply 242.

Hardware Configuration of Control System of Image Processing Apparatus

FIG. 3 shows a schematic diagram illustrating a hardware configuration of a control system of the image processing apparatus 10.

The network-communication line network 20 is connected to the main controller 200. The facsimile communication control circuit 236, the image reading unit 238, the image forming unit 240, and an UI touch panel 216 are connected to the main controller 200 through buses 33A to 33D such as a data bus and a control bus, respectively. That is, the main controller 200 functions as a main constituent and allows respective processing units of the image processing apparatus 10 to be controlled. In addition, a backlight unit for UI touch panel (refer to FIG. 4) may be provided to the UI touch panel 216.

In addition, the image processing apparatus 10 includes a power supply device 202, and the power supply device 202 is connected to the main controller 200 through a bus 33E. Power is supplied to the power supply device 202 from the commercial power supply 242. Power supply lines 35A to 35D, which independently supply power to each of the main controller 200, the facsimile communication control circuit 236, the image reading unit 238, the image forming unit 240, and the UI touch panel 216, are provided to the power supply device 202. Therefore, the main controller 200 allows power to be separately supplied to the respective processing units (devices) (a power supply mode) or allows power to be interrupted (a sleep mode), and therefore realizes a so-called partial power-saving control.

In addition, two motion sensors (a first motion sensor 28 and a second motion sensor 30) are connected to the main controller 200, and monitor whether or not a person is present in the vicinity of the image processing apparatus 10. The first motion sensor 28 and the second motion sensor 30 will be described later.

Functional Block Diagram Mainly Illustrating Configuration of Partial Power-Saving FIG. 4 shows a schematic configuration diagram mainly illustrating processing units (may be referred to as "loads", "devices", "modules", or the like) controlled by the main controller 200, and power lines of the power supply device 202, which are used to supply power to the main controller 200 and respective devices. In the exemplary embodiment of the invention, the image processing apparatus 10 may supply power or may not supply power for each processing unit (partial power-saving).

In addition, the partial power-saving for each processing unit is an example, and the processing units may be classified into several groups and the power-saving control may be performed for each group, or the power-saving control may be collectively performed with respect to the processing units.

Main Controller 200

As shown in FIG. 4, the main controller 200 includes a CPU 204, a RAM 206, a ROM 208, an I/O (input and output unit) 210, and a bus 212 such as a data bus and a control bus that connects these to each other. The UI touch panel 216 (including a backlight unit 216BL) is connected to the I/O 210 through an UI control circuit 214. In addition, a hard disk (HDD) 218 is connected to the I/O 210. The CPU 204 operates based on a program recorded on the ROM 208, the hard disk 218, or the like, thereby realizing a function of the main controller 200. In addition, the program is installed from the recording medium (CD, DVD, BD (Blu-Ray disc), USB memory, SD memory, or the like) storing the program, and based on this, through CPU 204 operating, the image processing function may be realized.

A timer circuit 220, and a communication line I/F 222 are connected to the I/O 210. In addition, each device of the facsimile communication control circuit (modem) 236, the image reading unit 238, and the image forming unit 240 is connected to the I/O 210.

In addition, timer circuit 220 (hereinafter, may be referred to as a "system timer") measures a time for making the facsimile communication control circuit 236, the image reading unit 238, and the image forming unit 240 into a power-saving state (power non-supply state).

Power is supplied to the main controller 200, and each device (the facsimile communication control circuit 236, the image reading unit 238, and the image forming unit 240) from the power supply device 202 (refer to the dotted line in FIG. 4). In addition, in FIG. 4, the power line is indicated by one line (dotted line), but actually the power line includes two or three wirings.

Power Supply Device 202

As shown in FIG. 4, the input power line 244 drawn from the commercial power supply 242 is connected to a main switch 246. When the main switch 246 is turned on, power may be supplied to a first power supply unit 248 and a second power supply unit 250.

The first power supply unit 248 includes a control power generating unit 248A and is connected to a power supply control circuit 252 of the main controller 200. The power supply control circuit 252 supplies power to the main controller 200, and performs a switching control for making power supply line to each device (the facsimile communication control circuit 236, the image reading unit 238, and the image forming unit 240) into a conduction state and a non-conduction state according to the control program of the main controller 200 connected to the I/O 210.

On the other hand, a first sub-power switch 256 (hereinafter, may be referred to as a "SW-1") may be interposed between the second power supply unit 250 and the power line 254 connected to the second power supply unit 250. It is preferable that the SW-1 be a relay switch in which a contact switching operation is accompanied with a mechanical operation, and is set to control on and off states in the power supply control circuit 252.

In addition, the second power supply unit 250 includes a 24 V power supply unit 250H (LVPS2), and a 5 V power supply unit 250L (LVPS1). The 24 V power supply unit 250H (LVPS2) is a power supply that is mainly used in a motor.

The 24 V power supply unit 250H (LVPS2) and the 5 V power supply unit 250L (LVPS1) of the second power supply unit 250 are selectively connected to a power supply unit 258 for the image reading unit, a power supply unit 260 for the image forming unit, a power supply unit 264 for the facsimile communication control circuit, and a power supply unit 266 for the UI touch panel.

The power supply unit 258 for the image reading unit uses the 24 V power supply unit 250H (LVPS2) as an input source and is connected to the image reading unit 238 through a second sub-power supply switch 268 (hereinafter, may be referred to as a "SW-2").

The power supply unit 260 for the image forming unit uses the 24 V power supply unit 250H (LVPS2) and the 5 V power supply unit 250L (LVPS1) as an input source and is connected to the image forming unit 240 through a third sub-power supply switch 270 (hereinafter, may be referred to as a "SW-3").

The power supply unit 264 for the facsimile communication control circuit uses the 24 V power supply unit 250H (LVPS2) and the 5 V power supply unit 250L (LVPS1) as an input source and is connected to the facsimile communication control circuit 236 and the image forming unit 240 through a fourth sub-power supply switch 274 (hereinafter, may be referred to as a "SW-4").

The power supply unit 266 for the UI touch panel uses the 5 V power supply unit 250L (LVPS1) and the 24 V power supply unit 250H (LVPS2) as an input source, and is connected to the UI touch panel 216 (including the backlight unit 216BL) through a fifth sub-power supply switch 276 (hereinafter, may be referred to as a "SW-5"). In addition, power may be supplied from a monitoring control unit 24 during power-saving for realizing the original function (function which excludes the backlight unit 216BL) of the UI touch panel 216.

The second sub-power supply switch 268, the third sub-power supply switch 270, the fourth sub-power supply switch 274, and the fifth sub-power supply switch 276 are on/off controlled based on a power supply selecting signal from the power supply control circuit 252 of the main controller 200, respectively, similarly to the first sub-power supply switch 256. Although not shown in the drawing, a switch or a wiring through which power of the 24 V power supply unit 250H and the 5 V power supply unit 250L are supplied is composed of two systems. In addition, each of the power supply switches 268, 270, 274, and 276 may be disposed in each device that is a power supply destination instead of the power supply device 202.

In the above-described configuration, power is supplied to each device (each of the facsimile communication control circuit 236, the image reading unit 238, and the image forming unit 240) that is selected for each function, and power is not supplied to a device that is unnecessary for an instructed function, such that a necessity minimum power is consumed.

Monitoring Control for Transition State of Image Processing Apparatus

Here, the function of the main controller 200 according to the exemplary embodiment of the invention may be made to be partially stopped so as to realize necessity minimum power-consumption. In addition, power supply may not be performed with respect to the majority of the main controller 200. This may be collectively referred to as a "sleep mode (power-saving mode)" (refer to FIG. 5).

It may be transitioned to the sleep mode by activating a system timer when the image processing is terminated. That is, power supply is stopped after a predetermined time is elapsed from the activation of the system timer. In addition, when an arbitrary operation (an operation of a hardware key, or the like) is performed until a predetermined constant time (for example, corresponds to step 104 in FIG. 9) is elapsed, the timer count to the sleep mode is stopped and the system timer is activated from the point of time when the next image processing is terminated.

On the other hand, during the sleep mode, the monitoring control unit 24 during power-saving as a device that is continuously powered is connected to the I/O 210. The monitoring control unit 24 during power-saving may be configured by, for example, an IC chip or the like that is called an ASIC and that includes CPU, RAM, ROM, or the like in which an operation program is stored, and which is processed by the operation program.

However, in the monitoring during the power-saving, it is supposed that for example, when a print request is transmitted from a communication line detecting unit and a FAX reception request is transmitted from a FAX line detecting unit, the monitoring control unit 24 during power-saving performs power supply with respect to the device during power-saving by controlling the first sub-power supply switch 256, the second sub-power supply switch 268, the third sub-power supply switch 270, the fourth sub-power supply switch 274, and the fifth sub-power supply switch 276 through the power supply control circuit 252.

In addition, a power-saving control button 26 is connected to the I/O 210 of the main controller 200, and when a user operates this power-saving control button 26 during power-saving, the power saving may be released. In addition, the power-saving control button 26 may be provided with a function that is operated when power is supplied to a processing unit and that compulsorily interrupts the supply of power to the processing unit to enter the processing unit into a power-saving state.

Here, it is preferable that a necessity minimum power be supplied to the power-saving control button 26 or each detection unit during power-saving in addition to the monitoring control unit 24 during power-saving so as to monitor the sleep mode. That is, even in the sleep mode that is a power non-supply state, power, which is equal to or less than a predetermined power (for example, 0.5 W or less) and which is necessary for a control for determining whether or not to perform power supply, may be supplied. A power supply source at this time is not limited to the commercial power supply 242, and a storage battery, a solar battery, a charger that is charged while power is supplied from the commercial power supply 242, or the like may be used.

In addition, in a specific period of the sleep mode (in an awake mode (awk) shown in FIG. 5), it is preferable to include a necessity minimum power supply mainly to an input system such as the UI touch panel 216 (excluding the backlight unit 216BL), and the IC card reader 217, or to further reduce luminance than an ordinary state.

However, in a case where in the sleep mode, when a user stands in front of the image processing apparatus 10 and then operates the power-saving control button 26 to restart power supply, a time may be necessary until the image processing apparatus 10 is started up.

Therefore, in this exemplary embodiment, the first motion sensor 28 and the second motion sensor 30 are provided to the monitoring control unit 24 during power-saving, and in the sleep mode, the motion sensors (the first motion sensor 28 and the second motion sensor 30) sense the user before the user operates (presses or the like) the power-saving control button 26 and thereby power supply is restarted early. Therefore, the user may quickly use the image processing apparatus 10 compared to a case where the user operates the power-saving control button 26 to start the use.

As shown in FIG. 4, the first motion sensor 28 and the second motion sensor 30 include a detection units 28A and 30A, and circuit board units 28B and 30B, respectively, and the circuit board units 28B and 30B adjust sensitivity of a signal detected by the detection unit 28A and 30A or generate an output signal.

In addition, in the first motion sensor 28 and the second motion sensor 30, "motion sensor" is described, but this is a proper noun that conforms to this exemplary embodiment, and it is preferable as long as at least a person is sensed (the same meaning as "detected"), and in other words, the "motion sensor" may include the sensing of a moving object other than a person. Therefore, in the following description, the detection object of the motion sensor may be referred to as "person", but a robot or the like that performs an operation instead of a person is also included as the sensing object in the future. In addition, contrary to this, in a case where a special sensor that can perform the sensing by specifying a person is present, the special sensor may be adopted. In the following description, a moving object, a person, a user or the like are treated in the same manner as an object that is detected by the first motion sensor 28 and the second-motion sensor 30, and are classified according to necessity.

First Motion Sensor 28

A specification of the first motion sensor 28 according to this exemplary embodiment of the invention is for detecting a motion of a moving object at the periphery of the image processing apparatus 10. In this case, an infrared sensor using a pyroelectric effect of a pyroelectric element, or the like is representative (pyroelectric sensor). In a first exemplary embodiment, the pyroelectric sensor is applied as the first motion sensor 28.

The greatest feature of the sensor using the pyroelectric effect of the pyroelectric element applied to the first motion sensor 28 is that for example, power-consumption is small and a detection area is wide compared to a reflective sensor or the like that includes a light transmitting portion and a light receiving portion. In addition, since the motion of the moving object is sensed, when a person stops within the detection area, the presence of the person is not detected. For example, in a case where a high level signal is output when a person is moving, when the person stops within the detection area, the signal becomes a low level signal.

In addition, the "stop" in the first exemplary embodiment absolutely includes a complete stop like a still image photographed by a still camera or the like, but for example, the "stop" may include a case where a person stops in front of the image processing apparatus 10 for the purpose of operation. Therefore, a slight movement (motion accompanying breathing or the like) within a predetermined range, or a case where hands and feet, a neck, or the like are moved may be included within a scope of the stop.

However, when a person does stretching exercises or the like in front of the image processing apparatus 10 while waiting a processing, for example, an image formation, an image reading, or the like at that place, the motion sensor 28 may detect the presence of a person.

Therefore, the sensitivity may be adjusted to be relatively broad and standard, instead of adjusting the sensitivity of the first motion sensor 28 by defining the "stop", and it may be configured to depend on the sensitivity characteristic of the first motion sensor 28. That is, when the first motion sensor 28 outputs one (for example, a high level signal) of binary signals, this may represent that a person is moving, and when a person is present within a detection range of the first motion sensor 28 and another one signal of the binary signal (for example, a low level signal) is output, this may represent the stop.

Second Motion Sensor 30

On the other hand, a specification of the second motion sensor 30 according to this exemplary embodiment of the invention is for detecting whether or not a moving object is present, a shape (contour), time sequential moving information, or the like at the periphery of the image processing apparatus 10, and for example, an image sensor (a CCD image sensor or a CMOS image sensor) may be applied to the second motion sensor 30.

The image sensor is a general sensor that is used as a moving picture pickup unit, such that the detailed description thereof is omitted, but when briefly describing, the image sensor is configured as described below.

The image sensor is mainly formed from a silicon single crystal semiconductor, and recognizes an amount of sensed light by counting freely moving electrons (signal charges) that are generated due to a photoelectric effect. Photodiodes are mainly used as a structure that collects the generated signal charges without letting the signal charge go off.

In the case of color image sensor, the degree of brightness may be sensed by only the amount of the signal charges of the photo diode, but it is difficult to sense a difference of a color, such that a color filter that lets only light of a specific color pass through is provided for each pixel.

For example, in the image sensor for a digital camera, the color filter has a color and pixel arrangement called a Bayer array. In filters of red, green, and blue colors that are called the three primary colors of light, the green color filter is used two times in relation to the red color or blue color filter. This is because sensitivity of the human eye with respect to green light is high (even in light having the same energy, the green color is felt as if it is brightest), and therefore a resolution of photographed image is increased.

On the contrary, the image sensor (CCD camera or the like) that is used as the second motion sensor 30 of this exemplary embodiment is not necessary to be matched to the sensitivity of the human eye. In other words, in the case of applying the image sensor as the second motion sensor 30, the arrangement of the color filter may be set according to contents analyzed based on a signal output from the second motion sensor 30, or the like.

As an example, in a case where authentication is made by performing authentication of a face of a person who approaches the apparatus instead of IC card authentication, the color filter may have a configuration which is appropriate for the face authentication (filter configuration in which mainly, the contours of a face, an eye, a nose, a mouth, or the like are clearly detected) when the image processing apparatus 10 of a sleep mode is transitioned to the awake mode, or the like.

In this exemplary embodiment, the filter is configured in such a manner that the output information from the second motion sensor 30 is made to be analyzed for the main purpose of face authentication, but recently, the filter may be configured to detect an identification card (including an identification card that is hung around a neck, an identification card that is held to a pocket using a clip, or the like) that is commonly used and is carried by individuals. Further, the filter may be configured for a barcode assigned to the identification card to be easily readable.

In addition, as another example, in a case where a device, which is started up according to a kind of document carried by a person approaching the image processing apparatus 10, is determined, the filter may have a configuration that easily distinguishes the kind of document. For example, a case may be considered where a transmission table of a facsimile is recognized, a device necessary for a facsimile transmission is started up, and a display type of the UI touch panel is determined by discriminating between monochrome and color.

In addition, in this exemplary embodiment, two areas (a first area F and a second area N in FIG. 6) are set by the first motion sensor 28 and the second motion sensor 30.

The first area F (may be just referred to as an "area F"), which is a relatively distant area in FIG. 6, is a detection area by the first motion sensor 28, and functions as a unit that detects a moving object that is relatively distant. In addition, the second area N (may be just referred to as an "area N", which is relatively near detection area in FIG. 6, is a detection area by the second motion sensor 30, and functions as a unit that detects a moving object that is relatively close.

The detection area of the first motion sensor 28 (refer to the first area F in FIG. 6) may be dependent on an environment of a place where the image processing apparatus 10 is disposed, but generally, it is substantially 2 to 5 m. On the other hand, the detection area (refer to the second area N in FIG. 6) of the second motion sensor 30 is within a range where an operation of the UI touch panel 216 or the hard key of the image processing apparatus 10 is possible, and generally, it is substantially 0 to 2 m. In addition, the first detection area F and the second detection area N are not limited to the above-described values, and these values described here are references intended for representing that the first area F is relatively wider than the second area N. Therefore, depending on the environment where the image processing apparatus 10 is disposed, sensitivity of the first motion sensor 28, or the like is set with respect to the relatively wide area (the first area F), and sensitivity of the second motion sensor 30, or the like is set with respect to the relatively narrow area (the second area N).

As shown in FIG. 6, a relationship between the moving object (user) and the image processing apparatus 10 is largely classified into three types. A first type is a type in which a person approaches the image processing apparatus 10 to a position at which an operation is possible for an intended purpose (refer to a tendency indicated by an arrow A in FIG. 6) (pattern A). A second type is a type in which a person approaches a position at which an operation is possible without a purpose of using the image processing apparatus 10 (refer to a tendency indicated by an arrow B in FIG. 6 (pattern B). A third type is a type in which a person does not approach a position at which an operation of the image processing apparatus 10 is possible but the person comes to a distance at which it may be transitioned into the first and second types (refer to a tendency indicated by an arrow C in FIG. 6) (pattern C).

In this exemplary embodiment, the tendency of a person is classified into at least the pattern A to the pattern C, and a state of the image processing apparatus 10, particularly, starting-up of the power supply state from the sleep mode or falling-down to the sleep mode from the power supply state is controlled.

However, in this exemplary embodiment, the second motion sensor 30 has a configuration that power is not supplied continuously. The second motion sensor 30 is configured in such a manner that power is supplied at a point of time when the moving object (user) enters the first area F in FIG. 6, which is under the control of the first motion sensor 28, and thereby an operation is started, and then at a point of time when the moving object (user) enters the second area N in FIG. 6, which is under the control of the second motion sensor 30, the second motion sensor 30 makes an instruction of starting up into standby mode from the sleep mode.

That is, two motion sensors (the first motion sensor 28 and the second motion sensor 30) in which the detection areas are different from each other are made to be in cooperation with each other, and thereby necessity minimum power is supplied to the sensors.

On the other hand, in regard to the interruption of the power supply to the second motion sensor 30, a timer function provided to the monitoring control unit 24 during power-saving is used together in addition to the detection situation of the moving object by the first motion sensor 28. This timer function may be referred to as a "sensor timer" to be distinguished from the above-described system timer.

The sensor timer is one of functions which the monitoring control unit 24 during power-saving has. That is, a control system has of course an operation clock, and may generate a timer from this clock signal or may generate a counter program that counts for each fixed time and for each process.

The monitoring control unit 24 includes an integrated circuit 150 (ASIC (Application Specific Integrated Circuit) that is one kind of electronic part and that is an integrated circuit in which circuits having plural functions are collected as one circuit for a particular use) that operates with a small power-consumption, and the integrated circuit 150 is activated (power is supplied thereto) in synchronization with the power supply to the second motion sensor operating with the largest power-consumption, and determines the transition time by the power supply state transition control unit based on the detection result of the second motion sensor 30.

FIG. 7 shows a block diagram functionally illustrating a transition destination mode, and a control for selecting a device to which power is supplied, which is performed by the integrated circuit 150 making up a part of the monitoring control unit 24. In addition, respective blocks in FIG. 7 functionally classify respective controls and are not intended to limit a hardware configuration.

Stepwise Power Supply Control of Sensor

Power is supplied to the monitoring control unit 24 from the power supply control circuit 252 as described above, and power is directly and continuously supplied to the first motion sensor 28, a detection information analyzing unit 152, and the power supply control unit 154 from the power supply control circuit 252.

Therefore, even in the sleep mode (refer to FIG. 5), the first motion sensor 28 continuously outputs detection information within the range of the detection area (the first area F shown in FIG. 6) to the detection information analyzing unit 152.

The detection information analyzing unit 152 analyzes whether or not a moving object moves within the range of the first area F, and when recognizing the movement of the moving object, transmits a supply instruction signal to the power supply control unit 154.

When receiving the supply instruction signal, the power supply control unit 154 supplies power to the power supply control circuit 252, the first motion sensor 28, and the integrated circuit 150.

In addition, a sensor timer 156 is connected to the power supply control unit 154, even when a predetermined time has been elapsed since power is supplied to the second motion sensor 30 or the like, in a case where the moving object is not detected in the detection area (the second area N shown in FIG. 5) by the second motion sensor 30, the power supply from the power supply control unit 154 to the second motion sensor 30 and the integrated circuit 150 is interrupted.

In addition, even when a predetermined time has been elapsed since it is started up from the sleep mode on the basis of the second motion sensor 30, in a case where a device does not operate, the power supply from the power supply control unit 154 to the second motion sensor 30 and the integrated circuit 150 is interrupted.

Individual Authentication Control by Integrated Circuit

As shown in FIG. 7, the second motion sensor 30 is connected to a signal receiving unit 158 of the integrated circuit 150.

When receiving a signal from the second motion sensor 30, the signal receiving unit 158 transmits this signal to a signal processing unit 160.

The signal processing unit 160 is connected to a feature area pixel extracting unit 162 and a storage unit 164 of reference data for each feature area part. When detecting a moving object using the signal from the second motion sensor 30, the signal processing unit 160 transmits the detection information by the second motion sensor 30 to the feature area pixel extracting unit 162, and transmits a reference data output instruction signal to the storage unit 164 of reference data for each feature area part In this exemplary embodiment, the storage unit 164 of reference data for each feature area part stores respective reference data for contours of the human face, an eye, a nose, and a mouth, and when receiving the reference data output instruction signal, transmits the reference data to the feature area pixel extracting unit 162.

The feature area pixel extracting unit 162 extracts the feature area (here, a contour image area, an eye image area, a nose image area, and a mouth image area) from the detection information, which is obtained by the second motion sensor 30, supplied from signal processing unit 160 on the basis of the reference data. In addition, the feature area part is not limited to the above-described contour of the face, the eye, the nose, and the mouth, and may be other feature area parts such as the coloring of the human face, winkles, a shape of hair. In addition, the feature area part is not limited to the face, and may be clothes, a kind of document carried by the person, an ID card hung around a neck, or the like.

In this exemplary embodiment, a feature part collating unit (contour) 166, a feature part collating unit (eye) 168, a feature part collating unit (nose) 170, and a feature part collating unit (mouth) 172 of four kinds (the contour, the eye, the nose, and the mouth) are connected to the feature area pixel extracting unit 162.

The feature part collating unit (contour) 166 is connected to a contour database 174 and performs the collation between the extracted contour and contours of people that are registered in the contour database 174 in advance.

The feature part collating unit (eye) 168 is connected to an eye image database 176 and performs the collation between the extracted eye image and eye images of people that are registered in the eye image database 176 in advance.

The feature part collating unit (nose) 170 is connected to a nose image database 178 and performs the collation between the extracted nose image and nose images of people that are registered in the nose image database 178 in advance.

The feature part collating unit (mouth) 172 is connected to a mouth image database 180 and performs the collation between the extracted mouth image and mouth images of people that are registered in the mouth image database 180 in advance.

The feature part collating unit (contour) 166, the feature part collating unit (eye) 168, the feature part collating unit (nose) 170, and the feature part collating unit (mouth) 172 are connected to an individual authentication unit 182, respectively, and transmit information collated in each of these units to the individual authentication unit 182.

The individual authentication unit 182 performs an individual authentication based on each of the collation information, and specifies individual information of, for example, a user whose registration is permitted in advance. Whether or not the specifying is permitted, and individual information of the user in the case of being specified are transmitted to a mode determining unit 186 and a processing device selecting unit 188 through an authentication result output unit 184.

The mode determining unit 186 determines an optimal mode of the image processing apparatus 10 based on information about whether or not the specifying is permitted and the individual information of the user, and outputs a starting up trigger to the main controller 200 through an information output unit 190. Power supply to the main controller 200 is started based on this starting up trigger, and a control of all of the transition modes based on this starting up trigger is performed.

In addition, the processing device selecting unit 188 selects a processing device that is necessary based on a job (printing, copying, scanning, facsimile transmission and reception, or the like) that is attempted to be performed by the specified user on the basis of the information about whether or not the specifying is permitted and the individual information of the user, and outputs the selected information to the main controller 200 together with the starting up trigger through an information output unit 190.

Hereinafter, an operation of this exemplary embodiment will be described.

Mode Transition of Power Supply Control of Image Processing Apparatus 10 (Device)

First, FIG. 5 shows a timing chart illustrating respective mode states, and an event serving as a trigger for transition of the mode states in the image processing apparatus 10.

In the image processing apparatus 10, an operation state in which a processing is not performed becomes a sleep mode, and in this exemplary embodiment, power is supplied only to the monitoring control unit 24 during power-saving.

Here, when a starting up trigger (the detection of the starting up trigger or an operation input (key input) of the UI touch panel 216 or the like) is present, the operation state transitions to a warming up mode.

In addition, a period after this starting up trigger may be still defined as the sleep mode and only the UI touch panel 216 may be made to operate, or an amount of power supply increases due to the operation of the UI touch panel 216 compared to the power supply only to the monitoring control unit 24 during power-saving, such that it may be defined as an awake mode "awk" (awaking mode) (refer to the inside of parentheses { } in the sleep mode range in the transition diagram of FIG. 5). When an operation input (key input) of the UI touch panel 216 or the like is made in the awake mode, the operation state transitions to a warming up mode.

As the starting up trigger, a signal, information, or the like, which is based on a detection result mainly by the second motion sensor 30 may be exemplified. In addition, a power-saving release operation performed by an operator may be set as the starting up trigger.

Since the warming up mode makes the image processing apparatus 10 become a state in which processing can be quickly realized, a maximum amount of power-consumption is necessary among respective modes, but when for example, an IH heater is used as a heater in a fixing unit, the warming up mode time becomes relatively short compared to a heater using a halogen lamp.

When the warming up operation by the warming up mode is terminated, the image processing apparatus 10 transitions to a standby mode.

The standby mode literally means a mode of "it is ready to prepare", and in the image processing apparatus 10, this standby mode becomes a state in which an image processing operation may be performed immediately.

Therefore, a job execution operation as a key input is present, an operation state of the image processing apparatus 10 transitions to a running mode, and image processing based on an instructed job is performed.

When the image processing is terminated (in a case where consecutive jobs are waited, when all of the jobs are completed), the operation state of the image processing apparatus 10 transitions to the standby mode by a standby trigger. In addition, a time measurement is started by the system timer after the image processing, and after a predetermined time is elapsed, a standby trigger may be output to transition to the standby mode.

A job execution instruction is made during this standby mode, it transitions again to the running mode, and when a stopping trigger is detected or when a predetermined time is elapsed, it transitions to the sleep mode.

In addition, as the stopping trigger, a signal, information, or the like, which is based on the detection result of the second motion sensor 30 may be exemplified. In addition, the system timer may be used together.

In addition, all the transitions of the mode state in the actual operation of the image processing apparatus 10 may not proceed in a time sequence like a timing chart. For example, it may transition to the sleep mode when a processing in the standby mode is stopped after the warming up mode.

Here, each device, which operates when power is supplied, may immediately execute each process by transitioning to the standby mode from the sleep mode in FIG. 5 through the awake mode and the warming up mode.

In this manner, the image processing apparatus 10 according to this exemplary embodiment transitions between respective modes, and an amount of power supply is different in each mode.

In the image processing apparatus 10 of this exemplary embodiment, when a predetermined condition (for example, information indicating that the moving object (use) leaves, which is obtained by the motion sensor 30, or an output of the stopping trigger due to a time-up by the system timer) is satisfied, it transitions to the sleep mode. In this sleep mode, power supply is interrupted with respect to not only each device of the facsimile communication control circuit 236, the image reading unit 238, and the image forming unit 240 but also the main controller 200 and the UI touch panel 216 excluding the monitoring control unit 24 during power-saving. In this case, it is preferable that the function of the power-saving control button 26 connected to the main controller 200 be stopped. Therefore, when the image processing apparatus 10 is viewed from the periphery thereof, it becomes substantially the same state as a main power supply switch is turned off. That is, it becomes a state in which the reliable execution of the sleep mode can be confirmed from the periphery (realization of visualization).

Power-Saving of Motion Sensor as Object

In this exemplary embodiment, the control of power supply to the detection system is performed by making the first motion sensor 28 and the second motion sensor 30 cooperate with each other. Specifically, a control is performed in such a manner that the first motion sensor 28 is powered continuously, but the second motion sensor 30 is powered based on the detection information by the first motion sensor 28, such that new improvement of an energy-saving property is established in addition to the power supply control with respect to a device.

More specifically, in regard to devices (the facsimile communication control circuit 236, the image reading unit 238, and the image forming unit 240) of the image processing apparatus 10, an appropriate transition mode (especially, the starting up from the sleep mode and the stopping into the sleep mode) is performed, in consideration of antinomy objects of the energy-saving property and convenience with each other on the basis of the first motion sensor 28 and the second motion sensor 30. In this case, it is assumed that power is supplied continuously with respect to the detection system such as the first motion sensor 28 and the second motion sensor 30.

On the contrary, in this exemplary embodiment, an entrance of the moving object (user) into the first area (F) shown in FIG. 6 is monitored while the power is supplied to the first motion sensor 28 but power is not supplied to the second motion sensor 30 during the sleep mode shown in FIG. 5. It is set to supply power to the second motion sensor 30, when the first motion sensor 28 detects the moving object (user) in the range of the first area F.

In addition, in this exemplary embodiment, an image sensor is applied as the second motion sensor 30, and a face authentication of the moving object is performed by analyzing a photographed image, such that accuracy of the power supply control with respect to a device increases. That is, a detection error of such things is prevented as when the moving object is detected but this moving object is not a person, and when this moving object is a person (non-user) who passes without stopping.

In addition, it may predict a use object or the like of the image processing apparatus 10 by analyzing the image photographed by the image sensor, by performing an individual authentication based on an individual information database registered in advance, and by specifying the individual information of the user within a permitted range.

Hereinafter, a power supply control routine of the detection system performed by the incorporation of the first motion sensor 28 and the second motion sensor 30 will be described with reference to a flowchart in FIG. 8.

FIG. 8 shows a flowchart illustrating a monitoring control routine mainly by the monitoring control unit.

In step 100, it is determined whether or not a moving object (user) is detected by the first motion sensor 28, and when it is determined negatively, it transitions to step 102. In step 102, it is determined whether or not the second motion sensor 30 is turned on, that is, power is supplied. When it is determined negatively in step 102, it returns to step 100, step 100 and step 102 are repeated until it is determined positively in step 100 or step 102.

When it is determined positively in step 100, it transitions to step 104. In step 104, the second motion sensor 30 is turned on, that is, power supply is started, and then transitions to step 106. In step 106, the sensor timer is reset and is started, and then it transitions to step 108.

In addition, when it is determined positively in step 102, this represents a state in which power is supplied to the second motion sensor 30, such that it transitions to step 108.

In step 108, it is determined whether or not the moving object (user) is detected by the second motion sensor 30, and when it is determined negatively, it transitions to step 110. In step 110, it is determined whether or not the time in the sensor timer is up. When it is determined negatively in step 110, it returns to step 108, and step 108 and step 110 are repeated until it is determined positively in step 108 and step 110.

When it is determined positively in step 110, it transitions to step 112. In step 112, the sensor timer is stopped, and then it transitions to step 113. In step 113, the second motion sensor 30 is turned off, that is, power supply is interrupted, and then it returns to step 100 and the above-described processes are repeated.

In addition, when it is determined positively in step 108, it transitions to step 114. In step 114, an image analysis process is performed based on the detection signal by the second motion sensor 30 (image sensor) (refer to FIG. 9).

In the next step 115, it is determined whether or not job, that is, processing details may be recognized from the result of the image analysis.

In a case where it is determined positively in step 115, it transitions to step 116. In step 116, a starting up trigger into the awake mode is output with respect to the main controller 200 (refer to FIG. 4), and then it transitions to step 118. Power is supplied with respect to a necessity minimum part of the image processing apparatus 10 due to this starting up trigger, and it transitions from the sleep mode to the awake mode. Then, a necessary device is made to start based on an operation of the UI touch panel 216 by the user or the like, and it transitions to the running mode by an input of a job execution key or the like, thereby realizing the execution of the image processing.

In step 118, it is determined whether or not the time is up in the sensor timer that is started in step 106. When it is determined negatively in step 118, it transitions to step 120. In step 120, it is determined whether or not the operation of the system timer is started, and when it is determined negatively, it returns to step 118 and step 118 and step 120 are repeated until it is determined positively in step 118 or step 120.

When it is determined positively in step 118, it transitions to step 122. In step 122, the sensor time is stopped, and then it transitions to step 124. In step 124, the second motion sensor 30 is turned off, that is, power supply is interrupted, and this routine is terminated. In addition, when it is determined positively in step 120, it is determined that it is transitioned to the standby mode due to a waiting trigger and it transitions to step 121. In step 121, the control subject is changed to the main controller 200, and this routine is terminated.

In addition, when it is determined positively in step 115, since the processing details are recognized, it transitions to step 126. In step 126, a starting up trigger conforming to job details is output. That is, only a device necessary for the processing is started up and it transitions to the standby mode.

When the output of the starting up trigger in step 126 is terminated, it transitions to step 128. In step 128, the control subject is changed to the main controller 200, and this routine is terminated.

Hereinbefore, when the mode of the image processing apparatus 10 is the sleep mode, a control flow mainly describing power supply from a state where power is not supplied to the second motion sensor 30 is illustrated. Basically, power is not supplied to the second motion sensor 30 as long as the moving object (user) does not enter the first area F that is under the control of the first motion sensor 28, such that it is possible to improve the energy-saving effect in addition to power-saving of a device.

FIG. 9 shows control flowchart illustrating the analysis processing subroutine in step 114 of FIG. 8.

In step 130, image information is acquired from the second motion sensor 30.

When the image information is acquired, it transitions from step 130 to step 132. In step 132, reference data for each feature area part is read out, and it transitions to step 134. In step 134, a feature area image is extracted. In this exemplary embodiment, as the feature area image, contour of a face, an eye, a nose, a mouth, and the like are selected.

In next step 136, the feature area extracted for each part is collated with an individual feature area stored in the database, and it transitions to step 138. In step 138, an individual authenticating process is performed. Through this individual authenticating process, the person detected by the second motion sensor 30 is specified.

In step 140, a mode determination (determination about an appropriate transition mode of a device) is performed based on the information of the person specified through the individual authentication, and then it transitions to step 142. In step 142, a processing device is selected, and then it transitions to step 144. In step 144, information about the determined mode and the selected processing device are output, and this routine is terminated.

As described above, in this exemplary embodiment, the pyroelectric sensor is used as the first motion sensor 28, and the image sensor such as the CCD camera is used as the second motion sensor 30. In addition, power is supplied continuously to the first motion sensor 28 regardless of the kind of the mode, but power-consumption is suppressed in the second motion sensor 30 by interrupting power in the sleep mode. In addition, at a point of time when the moving object is detected by the first motion sensor 28, power is supplied to the second motion sensor 30, and the individual authentication is performed based on the photographed information obtained by the second motion sensor 30 to obtain information related to the user with accuracy higher than the detection accuracy by the first motion sensor 28. Therefore, it is possible to realize a necessity minimum power-consumption without deteriorating convenience.

Modification
Infrared Array Sensor

In addition, in this exemplary embodiment, the pyroelectric sensor is applied as the first motion sensor 28, but a two-dimensional array-type heat source detecting unit (infrared array sensor 28IR (refer to FIG. 7)) in which plural elements detecting a heat source are two-dimensionally arranged in the vertical direction and the horizontal direction may be applied as the first motion sensor 28. In addition, as an intermediate rank between the first motion sensor 28 and the second motion sensor 30 according to this exemplary embodiment, the infrared array sensor 28IR may be applied. Power-consumption is substantially 0.015 Wdc.

The above-described "intermediate rank" indicates that when classifying according to power-consumption, since power-consumption in the infrared array sensor 28IR is larger than that in the pyroelectric sensor and is less than that in the CCD camera, first, the monitoring may be performed continuously using the pyroelectric sensor, and when the moving object is detected, power may be supplied to the infrared array sensor 28IR, and then power may be supplied to the CCD camera.

Hereinafter, the configuration of the infrared array sensor 28IR will be described in detail on the basis of FIGS. 10A and 11C. In addition, a block diagram of a control function system shown in FIG. 10B is not intended to limit a hardware configuration, and respective blocks are made to classify the processing of a signal output from the infrared array sensor 28IR for each function.

Figure 10A:
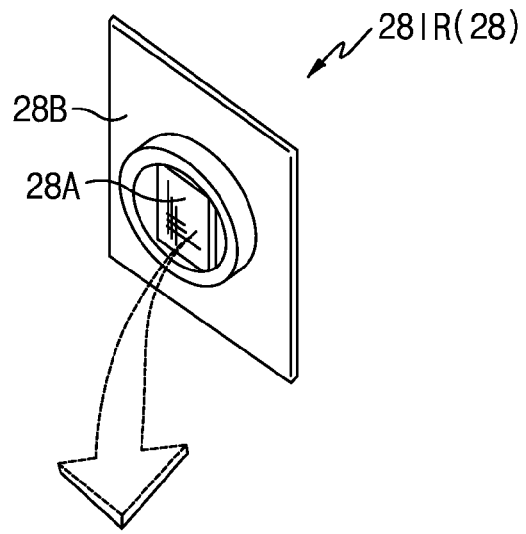
FIG. 10A is perspective view illustrating an external appearance of an infrared array sensor.
Figure 10B:
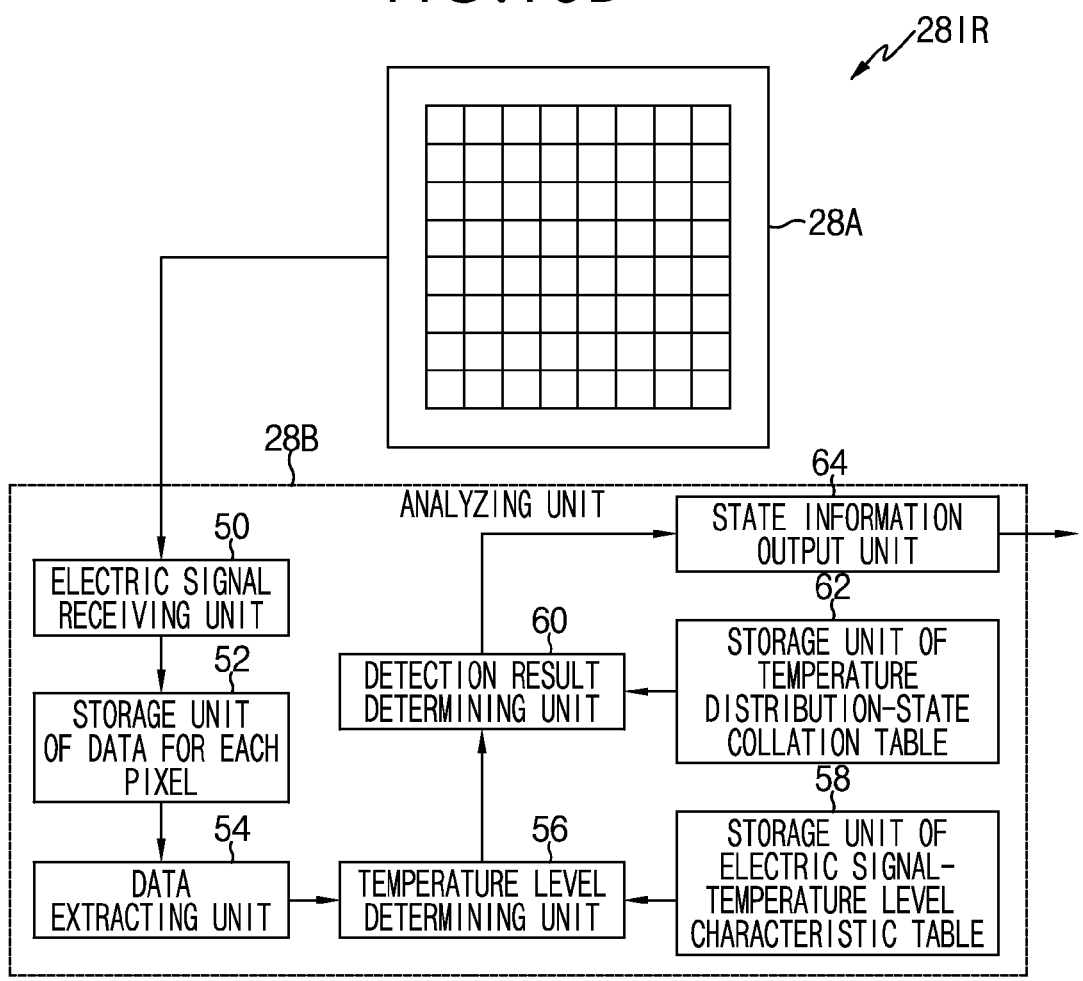
FIG. 10B is a front elevation view of a detection unit of the infrared array sensor and a functional block diagram of an analyzing unit.

As shown in FIG. 10A, the infrared array sensor 28IR includes a detection unit 28A and a circuit board unit 28B (hereinafter, may be referred to as an "analyzing unit 28B") in which the detection unit 28A is mounted on the center thereof.

The detection unit 28A includes elements that detect a heat source. The heat source detecting elements are thermopile elements, and the thermopile elements are arranged in a two-dimensional matrix shape of 8 (vertical)×8 (horizontal) (=64 elements) to have a multi-pixel structure. As a commercial product, Grid-Eye (product name) (registered trademark; manufactured by Panasonic Electric Works Co.) may be exemplified.

Specifications of the commercial infrared array sensor are as follows. The thermopile elements (array shape) as the sensor unit 28A, a focusing silicon lens, an MEMS (Micro Electra Mechanical Systems) sensor as the analyzing unit 28B, an IC, or the like are assembled to form a mounting module, an angle of view is 60°, and an area in front of 5 to 10 m in maximum is detected. This infrared array sensor may be applied as the first motion sensor 28 according to this exemplary embodiment.

In addition, the MEMS represents a device in which a mechanical component, a sensor, an actuator, and an electronic circuit are integrated on a silicon substrate, a glass substrate, an organic material, or the like.

The infrared array sensor 28IR analyzes a temperature distribution by a detection signal according to a thermal image detected by the detection unit 28A (thermopile elements), may sense a temperature variation of a person or a heat source in a specific space in a noncontact manner, and may detect a moving direction of a person or the like.

As shown in FIG. 10B, an electric signal from the detection unit 28A may be received in an electric signal receiving unit 50 of the analyzing unit 28B, and the signal detected by the respective thermopile elements is stored in a storage unit 52 of data for each pixel. In addition, here, all of the functions of the analyzing unit 28B are provided to the circuit board unit 28B shown in FIG. 4, but it is not necessary for the analyzing unit 28B to have all of the functions, and a part thereof may be a function of the monitoring control unit 24 shown in FIG. 4.

A data extracting unit 54 is connected to the storage unit 52 of data for each pixel, and for example, and data is extracted for each pixel unit and is transmitted to a temperature level determining unit 56. A storage unit 58 of electric signal-temperature level characteristic table is connected to the temperature level determining unit 56, and determines any one of temperature levels (in this exemplary embodiment, four steps shown in FIG. 11C) based on the received electric signal.

The determined temperature level information is transmitted to a detection result determining unit 60.

Figure 11A:
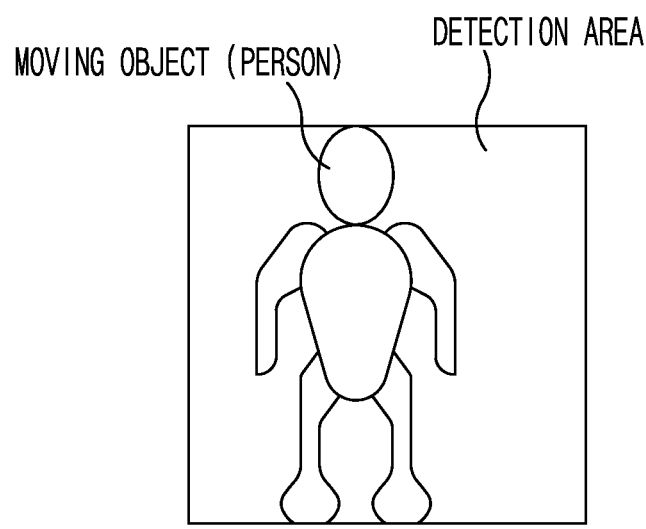
FIG. 11A is a front elevation view illustrating a detection area of an infrared area sensor according to the exemplary embodiment of the invention.
Figure 11B:
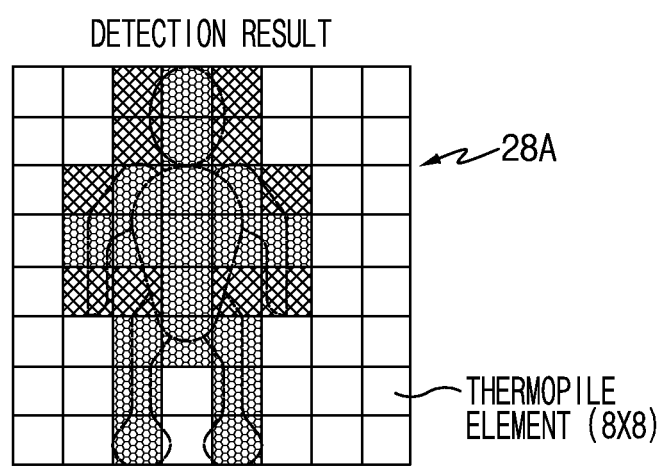
FIG. 11B is a temperature-distribution diagram (basic pattern) of the detection area in FIG. 11A.
Figure 11C:
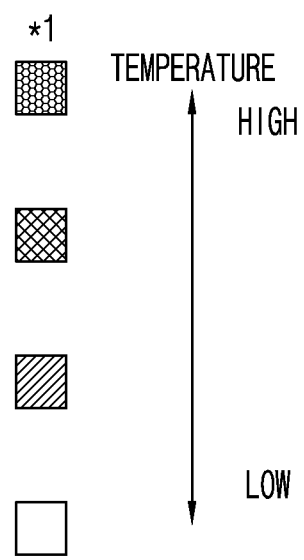
FIG. 11C is a diagram illustrating a temperature-distribution step in FIG. 11B.

A storage unit of temperature distribution-state collation table 62 is connected to the detection result determining unit 60. For example, as shown in FIG. 11A as a basic pattern, in a case where a person is present in a detection area of the detection unit 28A, the detection result determining unit 60 determines a state (here, "person is present", and "person is moving") from the detection result (temperature distribution) on the basis of the temperature distribution-state collation table that is stored in the storage unit of temperature distribution-state collation table 62 (refer to FIG. 11B).

Reflective Sensor

In addition, as a sensor that is intermediate in a rank between the first motion sensor 28 and the second motion sensor 30 according to this exemplary embodiment, a reflective sensor may be applied.

The reflective sensor may detect whether or not the moving object is present (presence and absence), and includes a light transmitting portion and a light receiving portion. In addition, the light transmitting portion and the light receiving portion may be configured to be separated from each other.

The greatest feature of the reflective sensor is that the presence or absence of the moving object may be reliably detected by shielding and non-shielding of light incident to the light receiving portion. In addition, a detection area is located within a relatively short distance, because a quantity of light that is incident to the light receiving portion is restricted due to a quantity of light that is transmitted from the light transmitting portion or the like.

Gesture Sensor

In addition, as the first motion sensor 28, or a sensor that is intermediate in a rank between the first motion sensor 28 and the second motion sensor 30 according to this exemplary embodiment, a gesture sensor may be applied.

The gesture sensor detects an action as a Doppler difference using, for example, a microwave Doppler sensor, and Fourier-transforms a sensor detection signal to detect a gesture. Power-consumption is substantially 0.25 Wdc.

Figure 12:
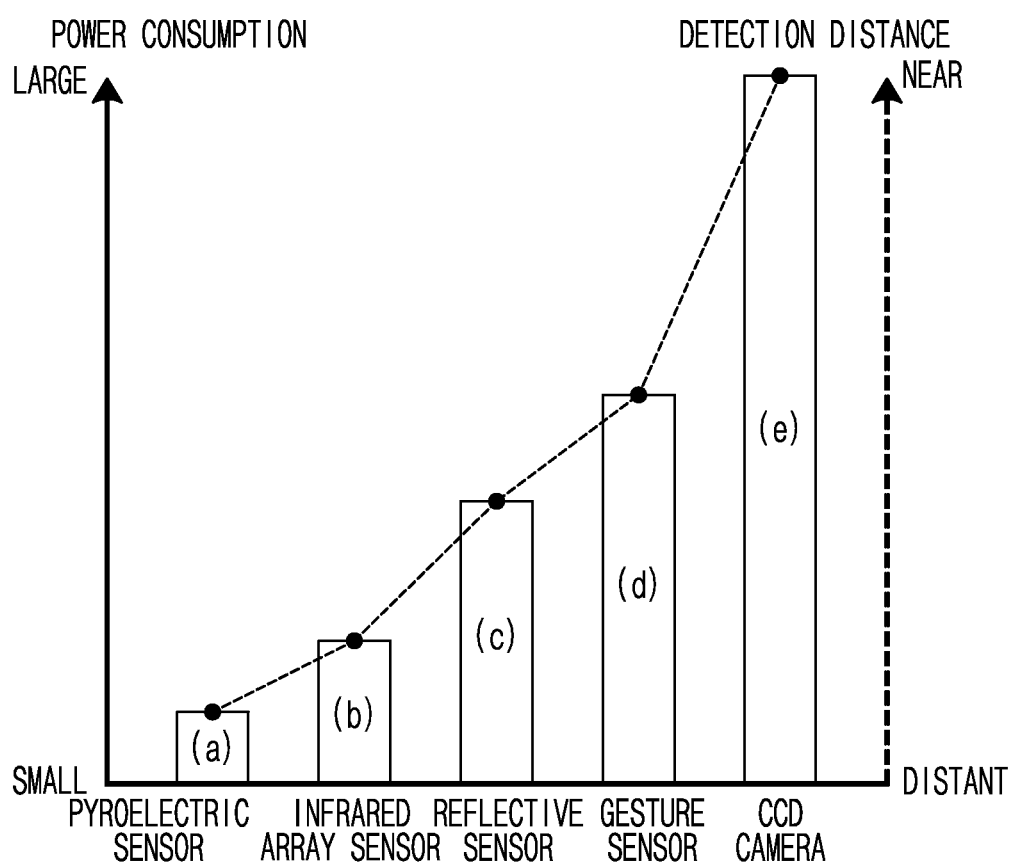
FIG. 12 is a characteristic diagram illustrating a correlation of specifications (a power-consumption and a detection distance) with respect to a pyroelectric sensor that is adopted as a first motion sensor, an image sensor (CCD, CMOS) that is adopted as a second motion sensor, and an infrared array sensor, a reflective sensor, and a gesture sensor that are intermediate in rank between the pyroelectric sensor and the image sensor.

FIG. 12 shows a characteristic diagram illustrating a correlation of specifications (a power-consumption and a detection distance) with respect to the pyroelectric sensor that is applied as the first motion sensor 28, the image sensor (CCD, CMOS) that is applied as the second motion sensor 30, and the infrared array sensor, the reflective sensor, and the gesture sensor, which are intermediate in a rank between the pyroelectric sensor and the image sensor. Sensors among the sensors shown in FIG. 12 may be selectively applied as the first motion sensor 28 and the second motion sensor 30, but it is preferable that a sensor such as an image sensor capable of authenticating an individual be selected as second motion sensor 30. In other words, the image sensor is not limited to the CCD or the CMOS and may be, for example, an infrared array sensor having highly dense pixel configuration or the like as long as the image sensor is a sensor capable of authenticating an individual.

Application Example of Power Supply Control Device

In the above-described exemplary embodiment, the power supply control device is applied as a control device that allows the mode of the image processing apparatus 10 to be transitioned, particularly, allows the mode to be transitioned from the sleep mode to the standby mode. However, the power supply control device may be applied to the case of supplying power to an apparatus in which the majority of power supply is interrupted, and power is supplied to a load in a stepwise manner according to necessity (including a case of supplying power from lower sensor to upper sensor).

Automatic Vending Machine

As represented by selling of drinking water, an automatic vending machine is installed on the road, in a shop, on the premises of a station, or the like. In addition, a light meal, a book, a newspaper, a flower bouquet, a toy, or the like are selling while not limited to the drinking water. In regard to the station, a ticket is also a kind of automatic vending machine.

It is not apparent when a purchaser operates such an automatic vending machine, such that the automatic vending machine is made to wait in a total power supply state in consideration of convenience in many cases. However, the vending machine may be frequently used, or may be discretely used, such that when considering energy-saving property, power may be supplied when a person approaches the vending machine, but on the road where a pedestrian traffic is intensive, it is difficult to determine whether or not a pedestrian is a purchaser.

Therefore, for example, in a case where a predetermined time is elapsed from not-purchasing state, power supply to a main function of an operation unit of the automatic vending machine is interrupted, and power is supplied to the first motion sensor 28. As the first motion sensor 28 in this case, a reflective sensor having a relatively narrow detection range is preferable to discriminate people who frequently pass by the automatic vending machine and a person who stands to face the automatic vending machine. In addition, the detection range may be adjusted by disposing a partition plate such as an aperture on a detection plane of the pyroelectric sensor.

When it is determined by the first motion sensor 28 that there is a possibility of using the automatic vending machine, power is supplied to the second motion sensor 30 at this point of time, and the individual authentication is performed.

For example, it is possible to provide a service in which a nationality determination database is created and is stored, and the nationality is determined by the individual authentication, and then a guide indication such as a destination is selectively displayed with native languages of various countries such as Japanese, English, and French. In addition, it is possible to provide a service in which a display screen or an operation plane faces a normal line according to stature (height of eyes).

Figure 13A:
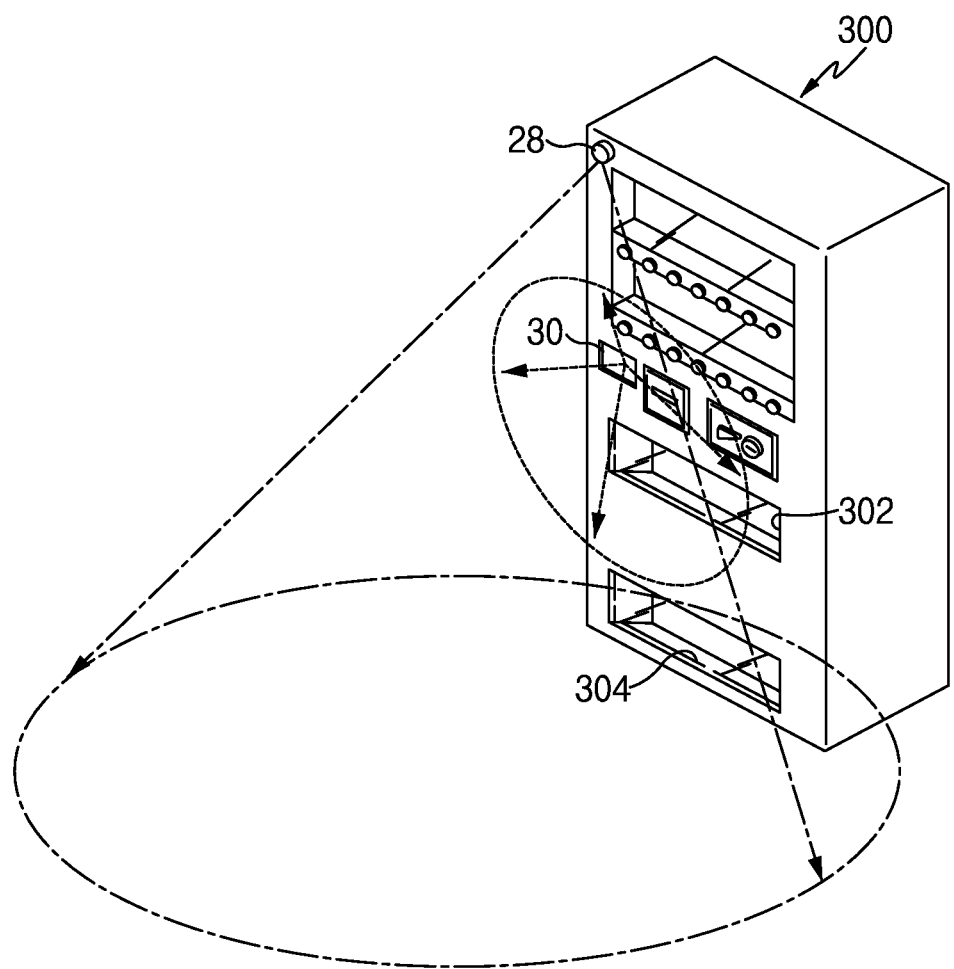
Figure 13B:
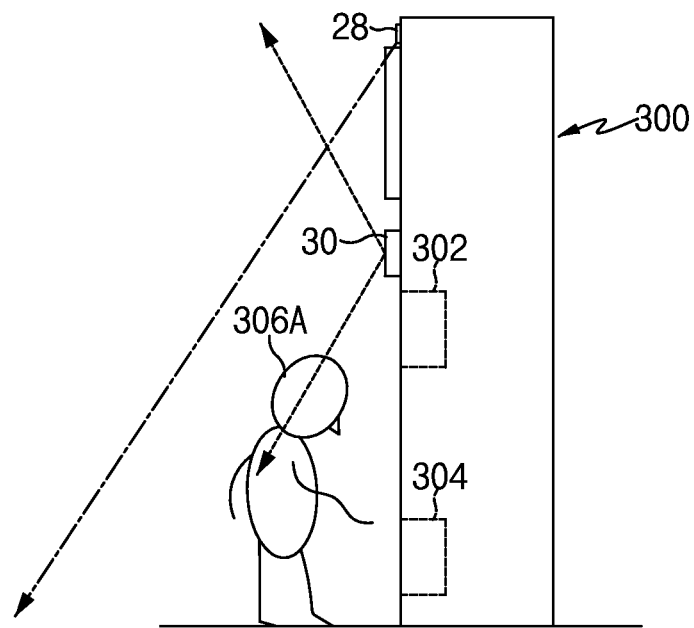
Figure 13C:
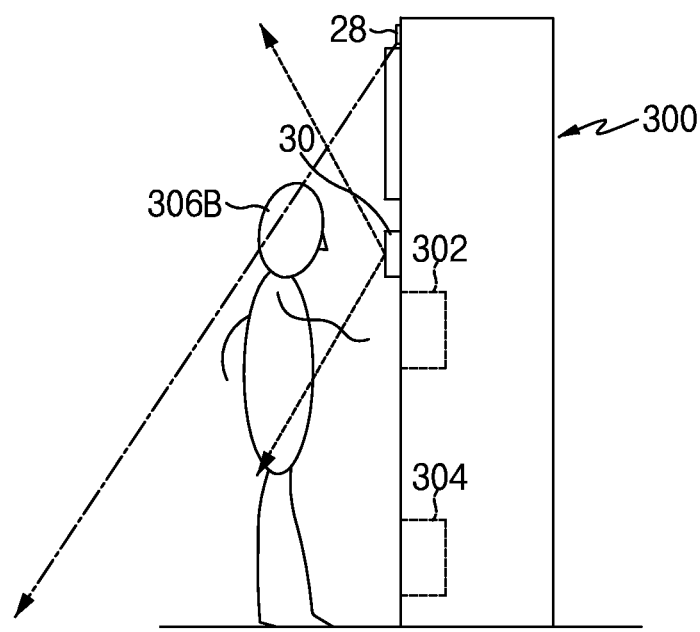

In addition, as shown in FIG. 13A, it is possible to provide a service in which the first motion sensor 28 and the second motion sensor 30 are provided to an automatic vending machine 300, a high-position discharge opening 302 and a low-position discharge opening 304 are formed, and stature (height of eyes) of purchasers 306A and 306B are determined through an individual authentication of the second motion sensor 30 to select the discharge opening. As shown in FIG. 13B, when it is determined that the purchaser 306A is small in stature, a purchased good is discharged from the low-position discharge opening 304. In addition, as shown in FIG. 13C, when it is determined that the purchaser 306B is large in stature, a purchased good is discharged from the high-position discharge opening 302.

Auto-Lock System

Figure 14:
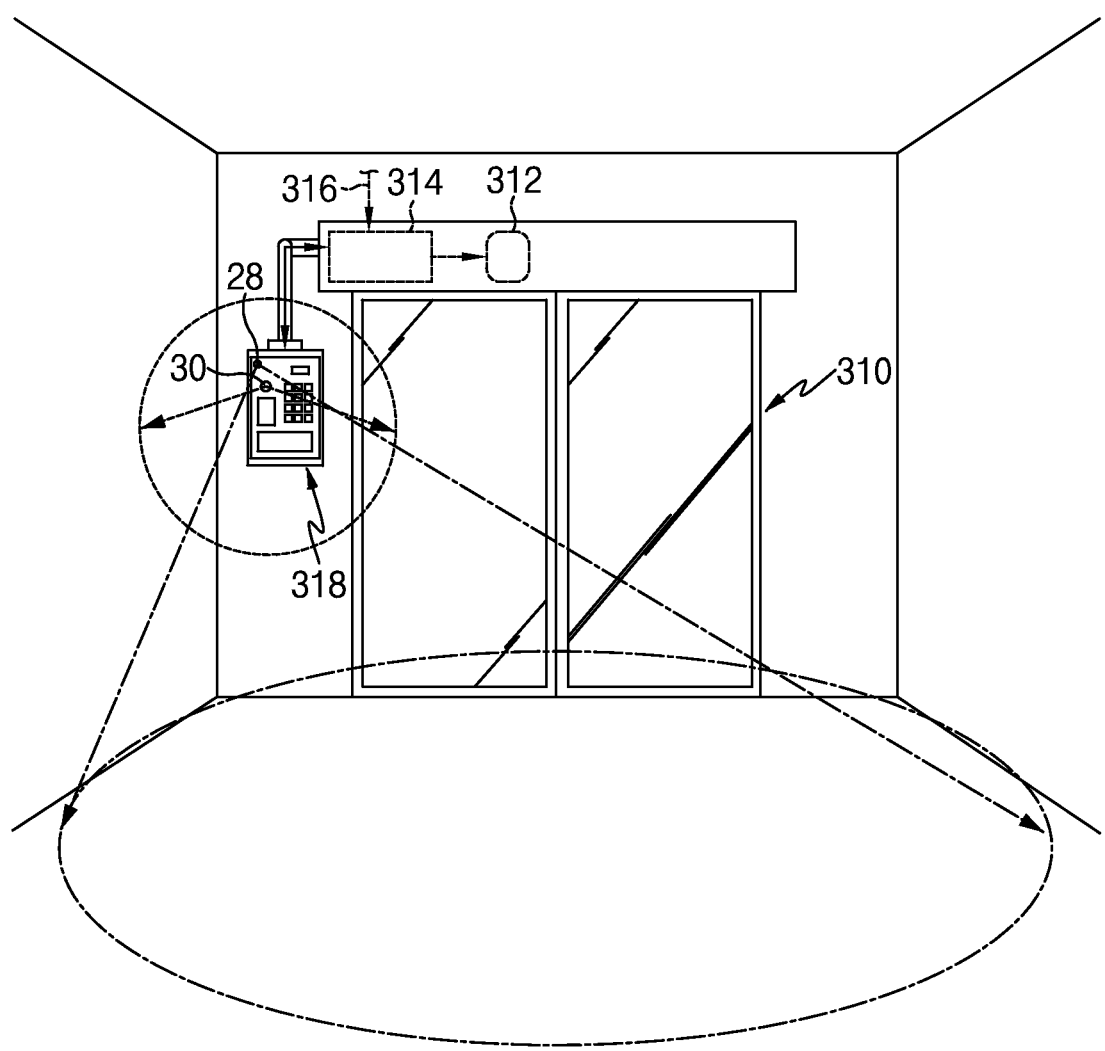
FIG. 14 is a front elevation view illustrating an entrance at which an auto-lock system is disposed to which the first and second motion sensors are adopted.

FIG. 14 shows a front elevation view illustrating a common entrance of an apartment or the like at which an auto-lock system is provided. An entrance door 310 is provided at the entrance, and the entrance has a configured to be opened and closed using a driving force of a driving unit 312 such as a motor. The driving unit 312 is controlled by a controller 314 of the auto-lock system.

Signal lines 316 of interphones provided at respective living rooms are collectively connected to the controller 314, and an operation panel 318 is connected to the controller 314. A resident may open the entrance door 310 by operating an identification number for each living room using the operation panel 318. In addition, a visitor may operate a room number of a destination, or the like, and then the entrance door 310 may be opened through an operation from each of the interphones.

In the auto-lock system in the related art, power is supplied continuously, such that convenience is established, but on the other hand, an energy-saving property is sacrificed. Therefore, the first motion sensor 28 and the second motion sensor 30 are provided to this auto-lock system, and power supply to units other than the first motion sensor 28 is interrupted using a timer or the like.

Then, the monitoring in the first motion sensor 28 is performed continuously, and at a point of time when detecting a person, power is supplied to the second motion sensor 30.

At this time, individual information (including an image of contour of a face, an eye, a nose, mouth, or the like) of a resident is registered in the database, and when it is authenticated as a resident through the individual authentication, the entrance door 310 is opened even when power is not supplied to the operation panel 318.

On the other hand, in a case where a person is not resident, power is supplied to the operation panel 318 to realize an input operation of a room number or the like.

In addition, when the second motion sensor 30 is applied, it is possible to provide an anticrime measure in which an image of a wanted criminal is registered in the database in cooperation with a neighboring police, and the alarm may be raised in a case where the registered image is coincident with the wanted criminal (or matches with the wanted criminal with a predetermined probability) who is not a resident. In addition, the alarm may include a measure in which power is not supplied to the operation panel 318 and a police or a security company is automatically informed, in addition to an operation of an alarm lamp or an alarm sound or instead of the operation.

In the above description, an exemplary embodiment in which the first motion sensor 28 and the second motion sensor 30 are provided mainly to the image processing apparatus 10 is described, and in these application examples, the automatic vending machine, and the auto-lock system are described. However, the first motion sensor 28 and the second motion sensor 30 may be applied to all of apparatuses in which power is supplied beginning with a low power-consumption side in a stepwise manner, and ultimately a next operation is predicted through an individual authentication, and then power supply is performed. In addition, through this application, the convenience and the energy-saving property may be compatible with each other.

In addition, an apparatus that the majority of power supply is interrupted, and power is supplied to a load in a stepwise manner according to necessity (including a case of supplying power from lower sensor to upper sensor) is installed in an office, a factory, a warehouse, a store, a hotel, a station, an airport, a parking area, a roadside, a passage, a market, a tourist facility, an event place, a school, a library, a public office, and public facilities other than these, private facilities, or the like, and when the power supply control device including mainly the first motion sensor 28 and the second motion sensor 30 according to the exemplary embodiment is provided to the apparatus, the convenience and the energy-saving property may be compatible with each other.

In addition, the first motion sensor 28 and the second motion sensor 30 are not necessary to be embedded in a device. For example, the first motion sensor 28 and the second motion sensor 30, or a part or all of the control system devices may be made from devices different from a monitoring device, and for example, may be connected in a wired or wireless fashion.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A power supply control device, comprising:
    a load that executes a predetermined process and operates when power is supplied from a power supply unit;
    a power supply state transition controlling unit that allows at least the load to be transitioned to a power supply state in which power is supplied from the power supply unit, or a power interruption state in which power is not supplied from the power supply unit;
    a plurality of detection units that can operate within respective power-consumption ranges that are set in a stepwise manner, and detects information related to the execution of the load;
    a power supply control unit for detection unit, which supplies power continuously with respect to a minimum power-consumption type detection unit that operates with the smallest power-consumption among the plurality of detection units, and which supplies power to a detection unit having a relatively large power-consumption based on a detection result of a detection unit having a relatively small power-consumption among the plurality of detection units; and
    a transition time determining unit that is executed when power is supplied with respect to a maximum power-consumption type detection unit operating with the largest power-consumption, among the plurality of detection units, through a stepwise power supply control performed by the power supply control unit for the detection units, and that determines a transition time by the power supply state transition controlling unit based on the detection result from the maximum power-consumption type detection unit.

2. The power supply control device according to claim 1, wherein as the detection unit, two or more detection units are selectively included among a pyroelectric detection unit that detects at least a movement of a moving object within a detection area, a two-dimensional array type heat source detection unit that has a multi-pixel structure by arranging a plurality of heat source detection elements, which outputs an electric signal according to a quantity of heat received from at least a heat source, in the vertical and horizontal directions, a reflective detection unit that detects whether or not the moving object is present within the detection area, an image pickup unit that has a multi-pixel structure by arranging a plurality of image pickup elements, which outputs grayscale information according to a concentration of a subject, in the vertical direction or the horizontal direction, or in the vertical and horizontal directions.

3. The power supply control device according to claim 1, wherein the maximum power-consumption type detection unit acquires information capable of authenticating an individual, which is necessary for the determination of the transition time.

4. The power supply control device according to claim 2, wherein the maximum power-consumption type detection unit acquires information capable of authenticating an individual, which is necessary for the determination of the transition time.

5. The power supply control device according to claim 1, wherein with respect to the load, an information detection distance is set in a stepwise manner in such a manner that the information detection distance for detecting information of the minimum power-consumption type detection unit is largest, and the information detection distance gradually decreases to the maximum power-consumption type detection unit.

6. The power supply control device according to claim 2, wherein with respect to the load, an information detection distance is set in a stepwise manner in such a manner that the information detection distance for detecting information of the minimum power-consumption type detection unit is largest, and the information detection distance gradually decreases to the maximum power-consumption type detection unit.

7. The power supply control device according to claim 3, wherein with respect to the load, an information detection distance is set in a stepwise manner in such a manner that the information detection distance for detecting information of the minimum power-consumption type detection unit is largest, and the information detection distance gradually decreases to the maximum power-consumption type detection unit.

8. The power supply control device according to claim 4, wherein with respect to the load, an information detection distance is set in a stepwise manner in such a manner that the information detection distance for detecting information of the minimum power-consumption type detection unit is largest, and the information detection distance gradually decreases to the maximum power-consumption type detection unit.

9. The power supply control device according to claim 5, wherein the information acquired by the maximum power-consumption type detection unit is selectively collated with a plurality of pieces of individual authentication information collected according to authentication types that are different from each other, and the transition time by the power supply state transition control unit is determined based on the selected individual authentication information.

10. The power supply control device according to claim 6, wherein the information acquired by the maximum power-consumption type detection unit is selectively collated with a plurality of pieces of individual authentication information collected according to authentication types that are different from each other, and the transition time by the power supply state transition control unit is determined based on the selected individual authentication information.

11. The power supply control device according to claim 7, wherein the information acquired by the maximum power-consumption type detection unit is selectively collated with a plurality of pieces of individual authentication information collected according to authentication types that are different from each other, and the transition time by the power supply state transition control unit is determined based on the selected individual authentication information.

12. The power supply control device according to claim 8, wherein the information acquired by the maximum power-consumption type detection unit is selectively collated with a plurality of pieces of individual authentication information collected according to authentication types that are different from each other, and the transition time by the power supply state transition control unit is determined based on the selected individual authentication information.

13. The power supply control device according to claim 9, wherein the maximum power-consumption type detection unit is the image pickup unit.

14. The power supply control device according to claim 10, wherein the maximum power-consumption type detection unit is the image pickup unit.

15. The power supply control device according to claim 11, wherein the maximum power-consumption type detection unit is the image pickup unit.

16. The power supply control device according to claim 12, wherein the maximum power-consumption type detection unit is the image pickup unit.

17. The power supply control device according to claim 1, wherein the load is classified into a plurality of processing units, which operates when power is supplied, and executes a predetermined process, and an instruction unit that selectively instructs at least processing details with respect to the plurality of processing units, as a mode that is transitioned to the power interruption state, a sleep mode that supplies power to a monitoring control unit that analyzes the detection result obtained by the moving object detection unit, and an awake mode that supplies power to the instruction unit according to necessity are provided, as a mode that is transitioned to the power supply state, a plurality modes, which includes a warming up mode that is a preparatory stage for starting up the process unit from the sleep mode, a standby mode that supplies power lower than that in a steady state with respect to the processing unit, and a running mode that supplies power in the steady state with respect to the processing unit, are provided, and the mode is transitioned according to a processing situation.

18. An image processing apparatus, comprising:
the power supply control device according to claim 1,
wherein the load includes at least one of an image reading unit that reads an image from a document image, an image forming unit that forms an image on a recording medium based on image information, a facsimile communication control unit that transmits the image to a transmission destination under a predetermined communication protocol, a user interface unit that notifies a user of reception of information, and a user identification unit that identifies a user, and performs an image processing in cooperation with each other based on an instruction from the user, and the plurality of detection units are provided as a substitute for a partial function of the user interface unit or the user identification unit.

19. A non-transitory computer readable medium storing a program that is executed by the power supply control device according to claim 1.

20. A power supply control method, comprising:
controlling a power supply state to allow at least a load, which executes a predetermined process and operates when power is supplied, to be transitioned to a power supply state in which power is supplied, or a power interruption state in which power is not supplied;

operating within respective power-consumption ranges that are set in a stepwise manner, and detecting information related to the execution of the load;

controlling power supply for detection units in such a manner that power is supplied continuously with respect to a minimum power-consumption type detection unit that operates with the smallest power-consumption among a plurality of detection units, and power is supplied to a detection unit having a relatively large power-consumption based on a detection result of a detection unit having a relatively small power-consumption among the plurality of detection units; and in a case where power is supplied with respect to a maximum power-consumption type detection unit operating with the largest power-consumption, among the plurality of detection units, through a stepwise power supply control performed in the controlling of a power supply for a detection unit, determining a transition time in the controlling of a power supply state transition based on the detection result from the maximum power-consumption type detection unit.

* * * * *